(12) United States Patent
Aurongzeb et al.

(10) Patent No.: US 9,876,268 B2
(45) Date of Patent: Jan. 23, 2018

(54) COMPOSITE CHASSIS WALL WITH WIRELESS TRANSMISSION WINDOW

(71) Applicant: Dell Products L.P., Round Rock, TX (US)

(72) Inventors: Deeder M. Aurongzeb, Round Rock, TX (US); Simon Sim, Shanghai (CN); Carlo Tian, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/674,209

(22) Filed: Aug. 10, 2017

(65) Prior Publication Data
US 2017/0346157 A1 Nov. 30, 2017

Related U.S. Application Data

(63) Continuation of application No. 14/154,424, filed on Jan. 14, 2014.

(51) Int. Cl.
H01Q 1/24 (2006.01)
H01Q 1/22 (2006.01)
B32B 5/26 (2006.01)
B29C 70/88 (2006.01)
B32B 3/18 (2006.01)
H01Q 1/40 (2006.01)

(52) U.S. Cl.
CPC ........... *H01Q 1/2266* (2013.01); *B29C 70/88* (2013.01); *B32B 3/18* (2013.01); *B32B 5/26* (2013.01); *H01Q 1/243* (2013.01); *H01Q 1/40* (2013.01); *B32B 2250/05* (2013.01); *B32B 2250/20* (2013.01); *B32B 2262/0269* (2013.01); *B32B 2262/101* (2013.01); *B32B 2262/105* (2013.01); *B32B 2262/106* (2013.01); *B32B 2457/00* (2013.01); *Y10T 156/10* (2015.01); *Y10T 428/2476* (2015.01); *Y10T 428/24752* (2015.01)

(58) Field of Classification Search
CPC .......... H01Q 1/2226; H01Q 1/24; B32B 5/26; B32B 38/18; B32B 3/14; B32B 37/186; B32B 2250/20
USPC ......................................... 343/702, 872, 873
See application file for complete search history.

(56) References Cited

U.S. PATENT DOCUMENTS

2012/0021196 A1* 1/2012 Kenney .................. B29C 70/34
428/213
2013/0273295 A1 10/2013 Kenney et al.
2015/0200442 A1 7/2015 Aurongzeb et al.

* cited by examiner

*Primary Examiner* — Joseph Lauture
(74) *Attorney, Agent, or Firm* — Haynes and Boone, LLP

(57) ABSTRACT

An IHS chassis houses a wireless communications device with an antenna. A IHS chassis wall includes aesthetic fiber layers that are free of a carbon fiber material and that provide both an inner and outer surface of the chassis wall. A plurality of composite fiber layers are located between the aesthetic fiber layers, with each composite fiber layer including a first fiber layer section with a carbon fiber material, and one or more second fiber layer sections that are free of a carbon fiber material and include a non-carbon fiber material that extends between the carbon fiber material in the first fiber layer section. The one or more second fiber layer sections align to provide one or more wireless transmission windows adjacent the antenna. The carbon fiber material and the non-carbon fiber material may have the same tow size to prevent the appearance of seams.

20 Claims, 25 Drawing Sheets

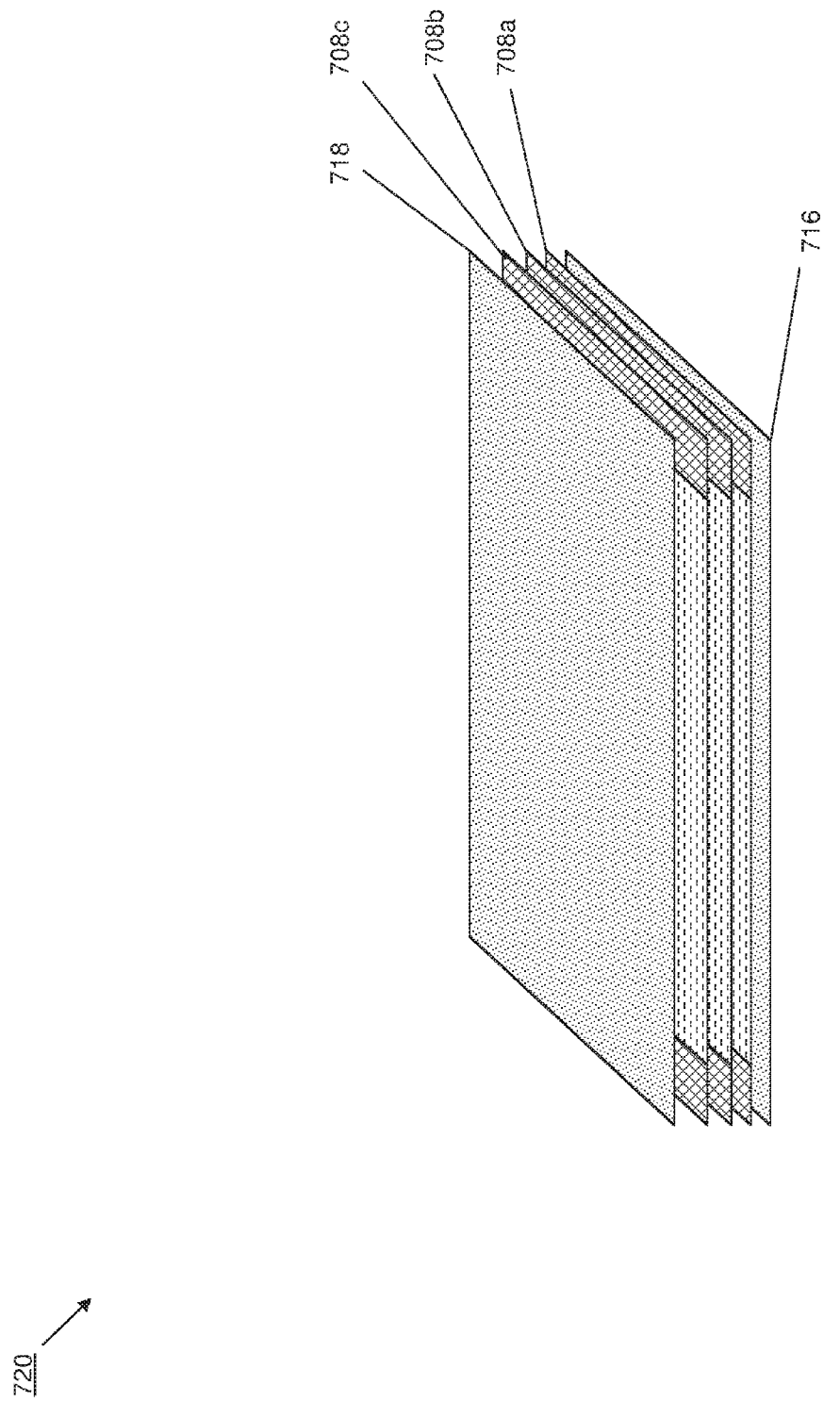

COMPOSITE CHASSIS WALL WITH WIRELESS TRANSMISSION WINDOW

CROSS-REFERENCE TO RELATED APPLICATIONS

This is a Continuation application to U.S. Utility application Ser. No. 14/154,424 filed Jan. 14, 2014, entitled "COMPOSITE CHASSIS WALL WITH WIRELESS TRANSMISSION WINDOW,", the disclosure of which is incorporated herein by reference in its entirety.

BACKGROUND

The present disclosure relates generally to information handling systems, and more particularly to composite wall on an information handling system chassis that includes a wireless transmission window.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

There is a desire for IHSs, and particularly portable IHSs such as laptop or notebook IHSs, tablet IHSs, and/or other portable IHSs known in the art, to be provided with lower and lower profiles and weights. This is realized by reducing the size and weight of IHS components and the IHS chassis, while maintaining or increasing the performance of the IHS components and the strength of the IHS chassis. One option for providing such IHS chassis is to use high strength, low weight fiber materials such as carbon fiber materials for the IHS chassis. However, the use of carbon fiber materials for an IHS chassis is subject to problems with regard to the transmission of wireless signals. For example, portable IHSs typically include an antenna positioned adjacent the display device for transmitting Radio Frequency (RF) signals, and an IHS display cover typically houses both the display device and the antenna. The use of carbon fiber materials as the IHS display cover introduces RF coupling issues with the transmission of RF signals from the antenna, and the solution to this issue is to provide the IHS display cover as an injected molded plastic part that does not interfere with the RF signals from the antenna. However, such injected molded plastic IHS covers are heavier, lower strength, and less marketable than the same size carbon fiber IHS cover would be.

Accordingly, it would be desirable to provide an improved IHS cover.

SUMMARY

According to one embodiment, an information handling system (IHS) includes a wireless communications device; an antenna coupled to the wireless communications device; and an IHS chassis housing the wireless communications device and the antenna, wherein the IHS chassis includes an IHS chassis wall having: a first aesthetic fiber layer that is free of a carbon fiber material and that provides an outer surface of IHS chassis wall; a second aesthetic fiber layer that is free of a carbon fiber material and that provides an inner surface of the IHS chassis wall that is opposite the IHS chassis wall from the outer surface; and a plurality of composite fiber layers located between the first aesthetic fiber layer and the second aesthetic fiber layer, wherein each of the plurality of composite fiber layers includes: a first fiber layer section that includes a carbon fiber material; one or more second fiber layer sections that are free of a carbon fiber material and that include a non-carbon fiber material that extends between the carbon fiber material in the first fiber layer section; wherein the plurality of composite fiber layers are stacked such that each of the one or more second fiber layer sections align to provide one or more wireless transmission windows that are positioned adjacent the antenna.

BRIEF DESCRIPTION OF THE DRAWINGS

FIG. 7a is a schematic view illustrating an embodiment of the provision of a first portion of a composite fiber layer in the method of FIG. 6a.

FIG. 7b is a schematic view illustrating an embodiment of the provision of a second portion of a composite fiber layer in the method of FIG. 6a.

FIG. 7c is a schematic view illustrating an embodiment of the provision of a third portion of a composite fiber layer in the method of FIG. 6a.

FIG. 7d is a schematic view illustrating an embodiment of the provision of a fourth portion of a composite fiber layer in the method of FIG. 6a.

FIG. 7e is a schematic view illustrating an embodiment of a composite fiber layer according to the method of FIG. 6a.

FIG. 7f is a schematic view illustrating an embodiment of the provision of a plurality of composite fiber layer between aesthetic layers in the method of FIG. 6b.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
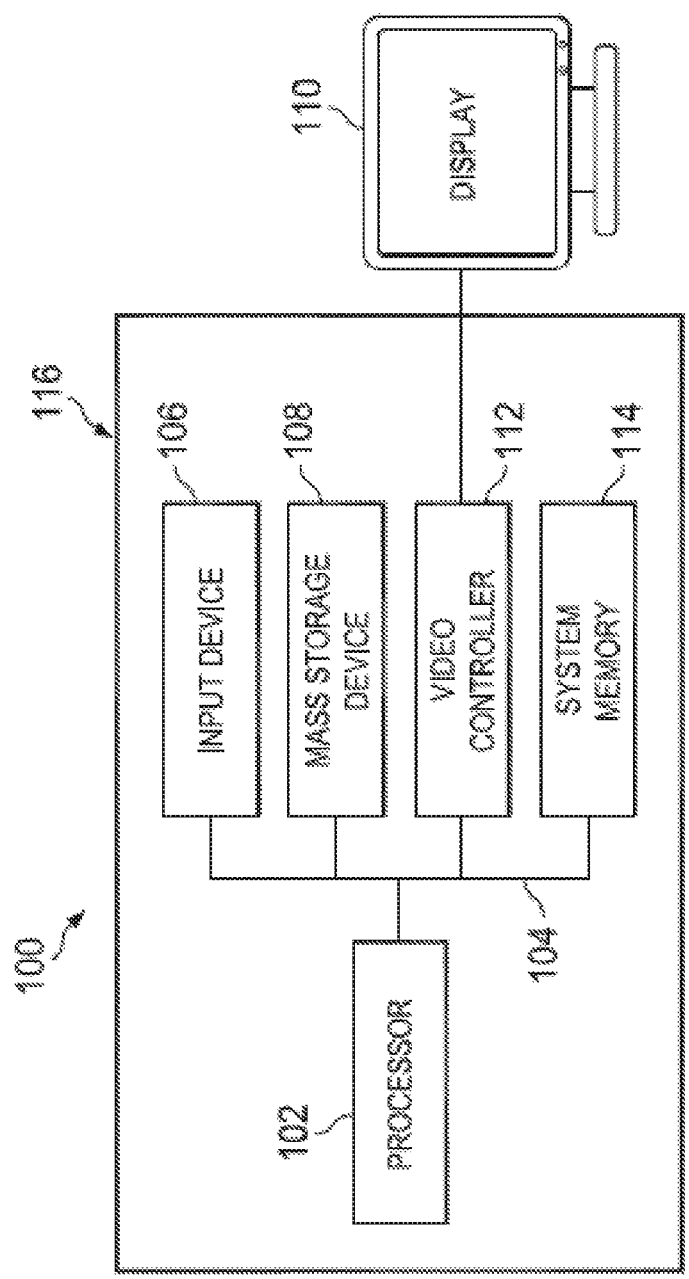
FIG. 1 is a schematic view illustrating an embodiment of an information handling system (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
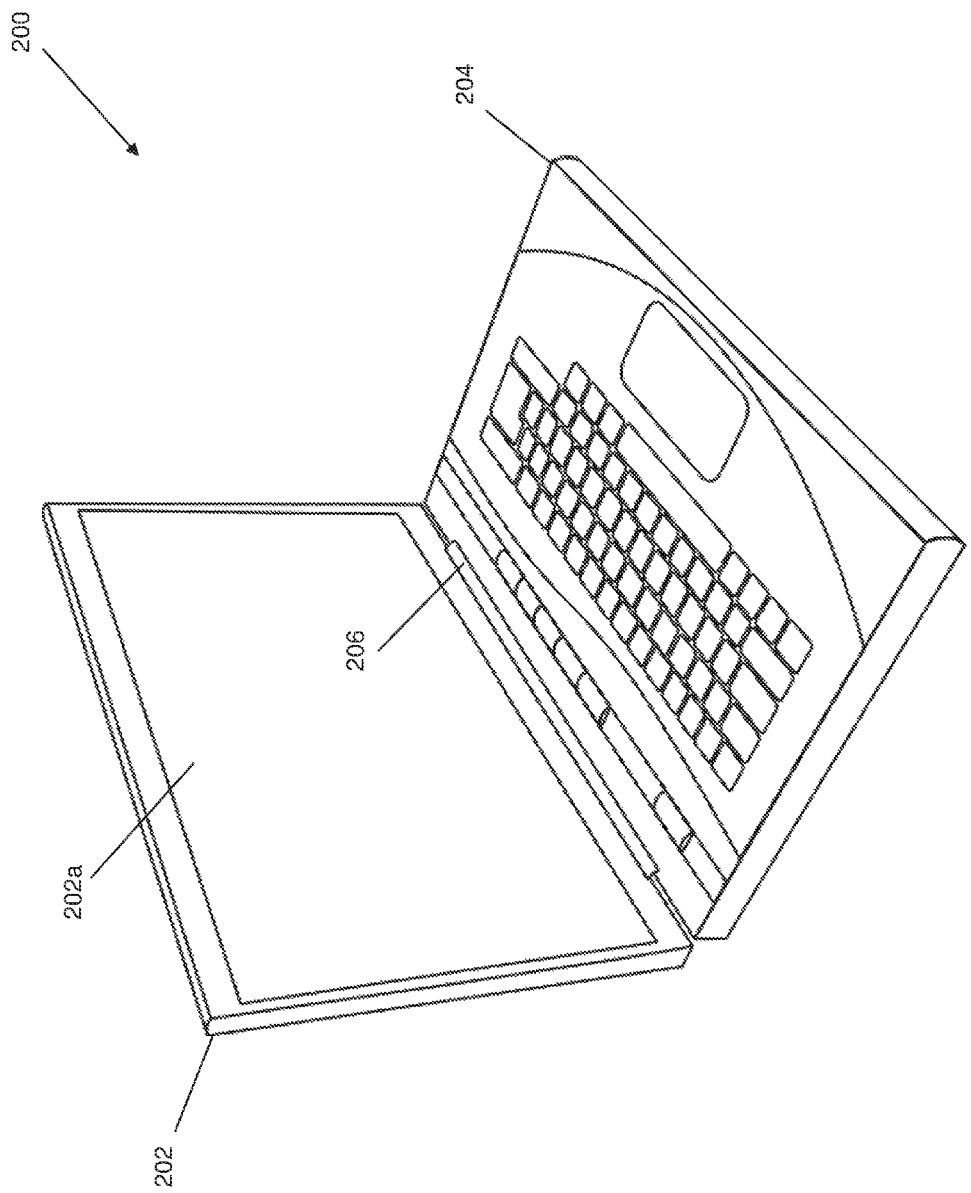
FIG. 2 is a perspective view illustrating an embodiment of an IHS.

Referring now to FIG. 2, an embodiment of an IHS 200 is illustrated. In an embodiment, the IHS 200 may be the IHS 100, discussed above with reference to FIG. 1, and/or may include some or all of the components of the IHS 100. One of skill in the art will recognize that the IHS 200 illustrated in FIG. 2 is a laptop or notebook IHS. However, a wide variety of other types of portable IHSs such as tablet IHSs, phone IHSs, and/or other portable IHSs known in the art, as well as relatively non-portable IHSs such as desktop IHSs, server IHSs, and/or other non-portable IHSs know in the art, may benefit from the teachings of the present disclosure and thus will fall within its scope. The IHS 200 includes a display chassis 202 moveably coupled to a base chassis 204 by a moveable coupling 206. The display chassis 202 houses a display device 202a (e.g., the display 110 discussed above with reference to FIG. 1) and may house other IHS components such as for example, the antenna or antennas discussed in further detail below. The base chassis 206 may house other IHS components (e.g., the IHS components discussed above with reference to FIG. 1) such as a wireless communications device, and those components may be coupled to components in the display chassis 202 (e.g., the wireless communications device in the base chassis 206 may be coupled to the antenna or antennas in the display chassis 202). While the embodiments below focus on a chassis wall of the display chassis 202 that houses the display device 202a and one or more antennae, one of skill in the art in possession of the present disclosure will recognize that the teachings of the present disclosure may be applied to antennas in the base chassis 204, and/or antennas in any IHS chassis (e.g., a tablet IHS chassis, phone IHS chassis, desktop IHS chassis, or server IHS chassis) while remaining within the scope of the present disclosure.

Figure 3A:
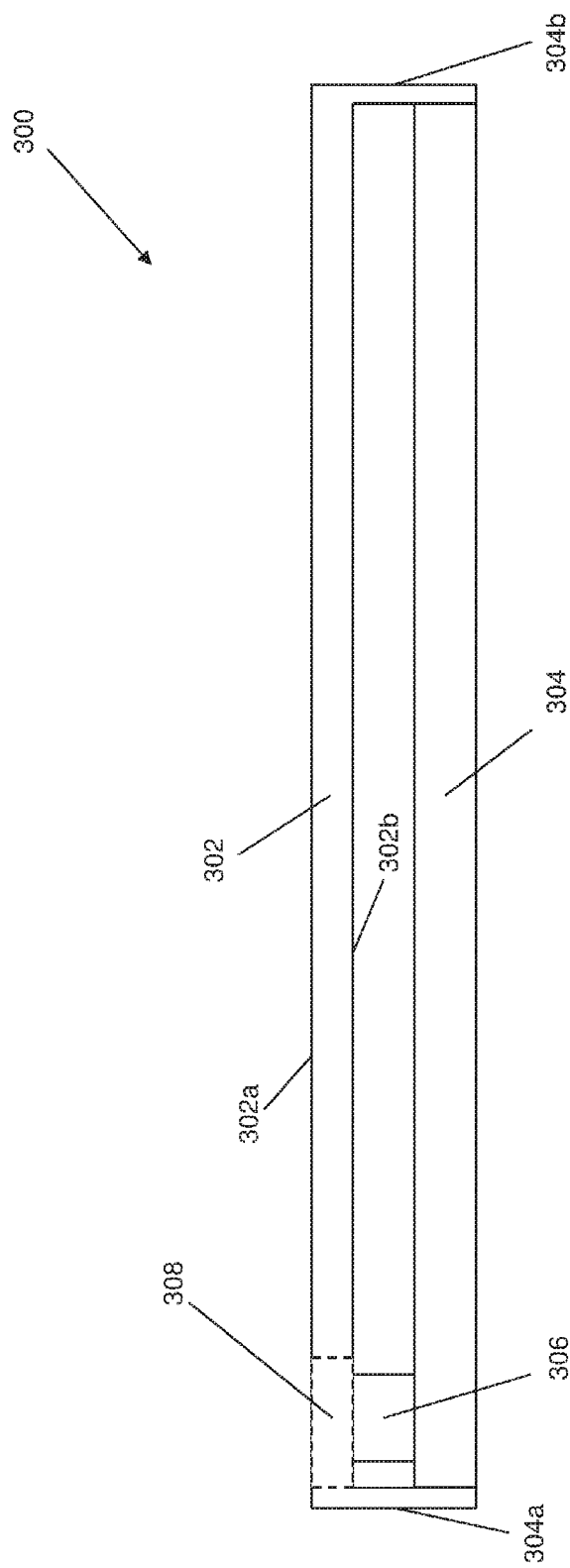
FIG. 3a a cross-sectional view illustrating an embodiment of an IHS chassis housing IHS components in the IHS of FIG. 2.
Figure 3B:
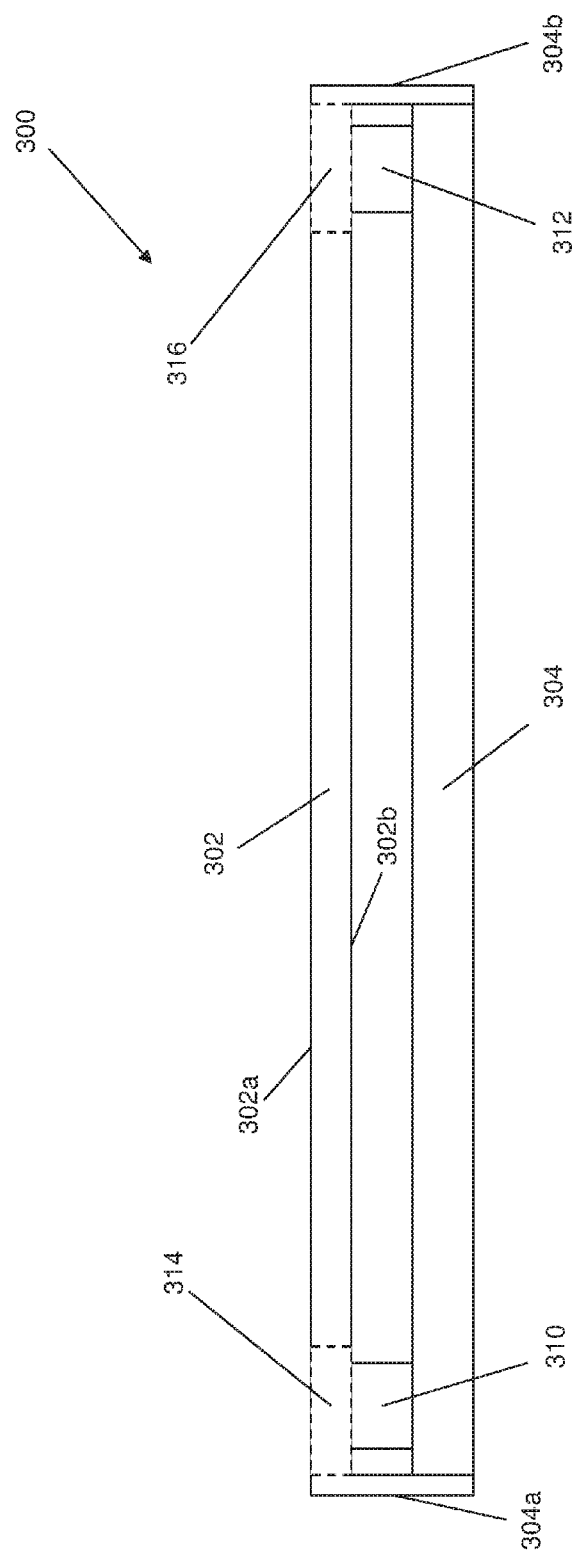
FIG. 3b a cross-sectional view illustrating an embodiment of an IHS chassis housing IHS components in the IHS of FIG. 2.

Referring now to FIGS. 3a, 3b, and 3b, different embodiments of a display chassis 300, which may be the display chassis 202 discussed above with reference to FIG. 2, having a chassis wall 302 are illustrated and described. However, as discussed above, the discussion of the display chassis and chassis walls in FIGS. 3a-c may be applied to other types of chassis or chassis portions as well. Referring first to FIG. 3a, the display chassis 300 includes the chassis wall 302 having a first/outer surface 302a and a second/inner surface 302b that is located opposite the chassis wall 302 from the first/outer surface 302a. A plurality of side walls (e.g., the side walls 304a and 304b illustrated in FIG. 3a) extend from the perimeter of the chassis wall 302. A display device 304, which may be the display device 202a discussed above with reference to FIG. 2, is at least partially housed in the display chassis 300, and may be coupled to the side walls (and/or other portions of the display chassis 302) such that a bezel is provided about the perimeter of the display device 304. In the illustrated embodiment, an antenna 306 is positioned between the display device 304 and the chassis wall 302 and adjacent the side wall 304a. The chassis wall 302 includes a wireless transmission window 308 that is located immediately adjacent the antenna 306 and that is discussed in further detail below. While the antenna 306 is illustrated and described as being located between the display device 304 and the chassis wall 302, in some embodiments the antenna 306 may be embedded in the wireless transmission window 308, discussed in further detail below.

Figure 3C:
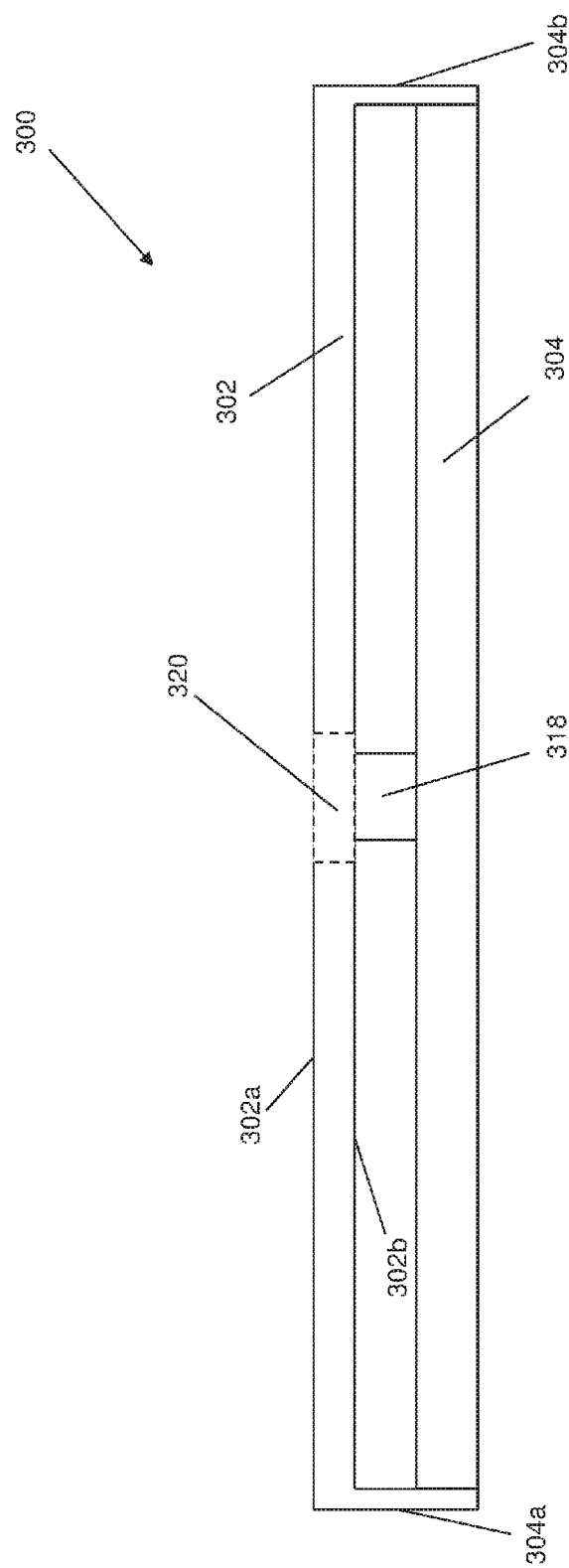
FIG. 3c a cross-sectional view illustrating an embodiment of an IHS chassis housing IHS components in the IHS of FIG. 2.

FIGS. 3b and 3c illustrated the display chassis 300 having similar features to that illustrated and described above with reference to FIG. 3a, but with some differences. FIG. 3b illustrates the display chassis 300 with a plurality of antennas, including an antenna 310 that is positioned between the display device 304 and the chassis wall 302 and adjacent the side wall 304a, and an antenna 312 that is positioned between the display device 304 and the chassis wall 302 and adjacent the side wall 304b. The chassis wall 302 includes a wireless transmission window 314 that is located immediately adjacent the antenna 310, and a wireless transmission window 316 that is located immediately adjacent the antenna 312, both of which are discussed in further detail below. While the antennas 310 and 312 are illustrated and described as being located between the display device 304 and the chassis wall 302, in some embodiments either or both of the antennas 310 and 312 may be embedded in the wireless transmission window 308, discussed in further detail below.

FIG. 3c illustrates the display chassis 300 with a centrally located antenna 318 that is positioned between the display device 304 and the chassis wall 302 approximately midway between the side wall 304a and the side wall 304b. The chassis wall 302 includes a wireless transmission window 320 that is located immediately adjacent the antenna 318, discussed in further detail below. While the antenna 318 is illustrated and described as being located between the display device 304 and the chassis wall 302, in some embodiments the antenna 318 may be embedded in the wireless transmission window 320, discussed in further detail below. While a few examples of antenna and wireless transmission window location positioning in the display chassis 300 have been provided, any number of antennae and any positioning of those antennae are envisioned as falling within the scope of the present disclosure. Furthermore, while the antennae in the embodiments discussed herein are schematically illustrated as having a generally rectangular shape, those antennas may include a variety of shapes, and the wireless transmission windows positioned adjacent those antennas (or embedding those antennas) may include substantially the same shape. As discussed above, the antenna or antennas of the present disclosure may be coupled to a wireless communications device such as, for example a wireless controller (as well as processors and other IHS components) which may be located in the same chassis that houses the antenna(s) (e.g., the display chassis 300 of the illustrated embodiment, an IHS chassis, etc.), or a chassis attached to the chassis that houses the antenna(s) (e.g., the base chassis 204).

As discussed above, it is desirable to use high strength, low weight fiber materials such as carbon fiber materials for IHS chassis. However, the use of carbon fiber materials for an IHS chassis is subject to problems with regard to the transmission of wireless signals, as an IHS chassis with a chassis wall that is made of carbon fiber materials will result in coupling issues (e.g., RF coupling issues) with the transmission of wireless signals (e.g., RF signals) from an antenna positioned adjacent that chassis wall that degrade the transmission of those wireless signals. However, it has been discovered that a chassis wall may be provided using one or more composite fiber layers that each have a fiber layer section including a carbon fiber material, along with one or more fiber layer sections including a non-carbon fiber material that does not degrade the transmission of wireless signals like the carbon fiber material. The non-carbon fiber material may be selected from non-carbon fiber materials with lower dielectric constants and higher resistivity relative to the carbon fiber material. When a plurality of the composite fiber layers are used for the chassis wall, those composite fiber layers may be stacked on each other such that the fiber layer sections including the non-carbon fiber material provide wireless transmission window(s), and the wireless transmission window(s) may be positioned on the chassis wall such they will be located adjacent any antennae in the IHS, or the antenna(s) may be embedded in the wireless transmission windows. This allows for IHS chassis including chassis walls made from high strength, low weight fiber materials that would otherwise degrade wireless transmissions. Characteristics of the carbon fiber material(s) and the non-carbon fiber material(s) may be selected to reduce or eliminate the appearance of seams on the chassis wall between the fiber layer sections including the carbon fiber material and the non-carbon fiber material.

In the embodiments discussed below, one or more composite layers are provided that include a carbon fiber material that conventionally interferes with wireless transmissions and a non-carbon fiber material that does not interfere with wireless transmissions, does not interfere with wireless transmissions to the level of the carbon fiber material, and/or otherwise does not significantly interfere with wireless transmission such those wireless transmissions may be provided in the same manner as through a conventional plastic IHS chassis wall. One of skill in the art in possession of the present disclosure will recognize that other wireless transmission interfering fiber materials may be substituted for, or used with, the carbon fiber material while remaining within the scope of the present disclosure. The non-carbon fiber material may include glass fiber materials, polymer fiber materials (e.g., Twaron®, Kevlar®, Vectran®, etc.), ceramic fiber materials (e.g., silicon carbide fiber materials), aramid fiber materials, Olefin fiber materials, semiconductor fiber materials, SiC fiber materials, Alumina fiber materials, polymeric fiber polyethylene (PE) fiber materials, extremely long chain fiber materials, high modulus polyethylene (HMPE) fiber materials (e.g., Dyneema® or Spectra®), combinations thereof, and/or a variety of other fiber materials that do not present the wireless transmission interference issues associated with carbon fiber and similar fiber materials. The one or more composite layers are positioned between aesthetic fiber layers that may include glass fiber materials, polymer fiber materials (e.g., Twaron®, Kevlar®, Vectran®, etc.), ceramic fiber materials (e.g., silicon carbide fiber materials), aramid fiber layers, Olefin fiber layers, semiconductor fiber layers, SiC fiber layers, Alumina fiber layers, polymeric fiber polyethylene (PE) fiber layers, extremely long chain fiber layers, high modulus polyethylene (HMPE) fiber layers (e.g., Dyneema® or Spectra®), and/or a variety of other fiber materials that do not present the wireless transmission interference issues associated with carbon fiber and similar fiber materials. Thus, while the examples below discuss particular fiber materials for each of the aesthetic and composite layers, other fiber materials with similar properties are envisioned as falling within the scope of the present disclosure. In some embodiments, non-carbon fiber materials in the aesthetic layer and composite layer(s) may be selected that will have a higher dielectric constant and higher resistivity relative to the carbon fiber (or similar) material in the composite layer(s).

Referring first to FIGS. 4, 5a, 5b, 5c, and 5d, a method 400 for providing a wireless transmission window in a chassis wall is illustrated. The method 400 describes the creation of a chassis wall with a wireless transmission window by providing composite fiber layers with a first fiber layer section including a carbon fiber material and a second carbon fiber layer section(s) including a non-carbon fiber material side-by-side in each composite layer, and stacking the composite fiber layers such that the non-carbon fiber layer sections align. The method 400 is directed to creating the chassis wall 302 of the IHS chassis 300 illustrated in FIG. 3a, and specifically to creating the wireless transmission window 308 for the antenna 306. However, as discussed below, the techniques described in the method 400 may be used for differently positioned antennae, and/or combined with the methods 600 and 800 discussed below while remaining within the scope of the present disclosure.

Figure 4:
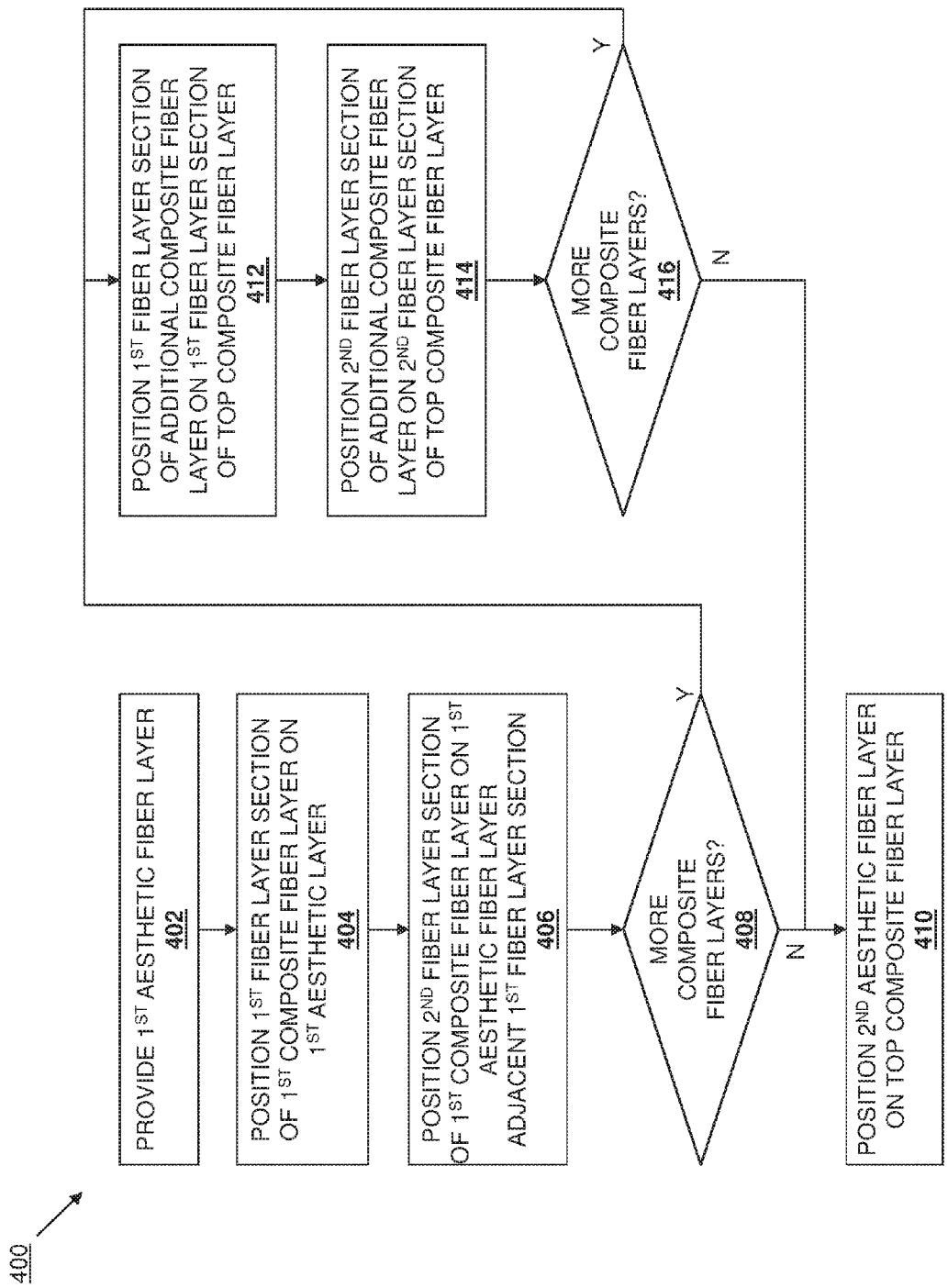
FIG. 4 is a flow chart view illustrating an embodiment of a method for providing a wireless transmission window in a chassis wall.
Figure 5A:
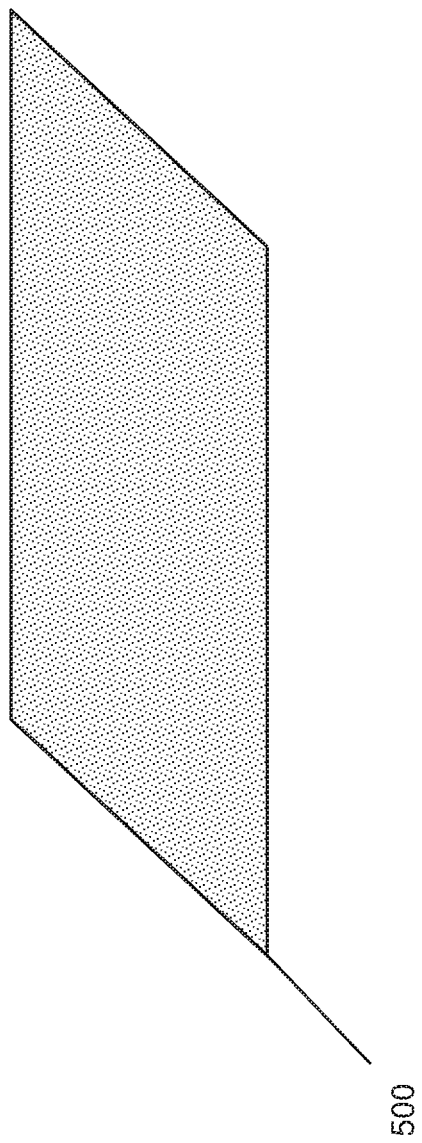
FIG. 5a is a schematic view illustrating an embodiment of the provision of a first aesthetic layer in the method of FIG. 4.
Figure 5B:
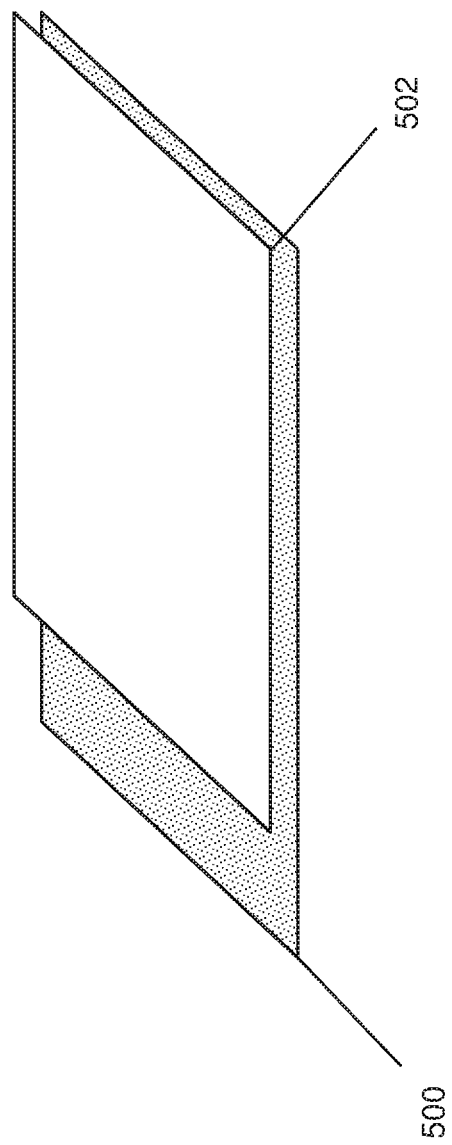
FIG. 5b is a schematic view illustrating an embodiment of the provision of a first fiber layer section of a composite fiber layer on an aesthetic layer in the method of FIG. 4.

Referring first to FIGS. 4, 5a, and 5b, the method 400 begins at block 402 where a first aesthetic fiber layer is provided. In an embodiment, a first aesthetic fiber layer 500 is provided in a chassis wall creation system, as illustrated in FIG. 5a. The method 400 then proceeds to block 404 where a first fiber layer section of a first composite fiber layer is positioned on the first aesthetic fiber layer. In an embodiment, a first fiber layer section 502 that includes a carbon fiber material is positioned on the first aesthetic fiber layer 500 using the chassis wall creation system and methods known in the art. In an embodiment, the first fiber layer section 502 includes a unidirectional fiber material having fibers that are positioned in a first fiber orientation when the first fiber layer section 502 is positioned on the first aramid fiber layer 500. In some examples, the first fiber layer section 502 may be solely a carbon fiber material, while in other examples, the first fiber layer section 502 may include the carbon fiber materials along with additional, other materials.

The method 400 then proceeds to block 406 where a second fiber layer section of the first composite fiber layer is positioned on the first aesthetic fiber layer adjacent the first fiber layer section. In an embodiment, a second fiber layer section 504 that is free of the carbon fiber material and that may include a glass fiber material, a polymer fiber material, a ceramic fiber materials, combinations thereof, and/or other non-carbon fiber materials known in the art, is positioned on the first aesthetic fiber layer 500 adjacent the first fiber layer section 502 using the chassis wall creation system and methods known in the art. In an embodiment, the positioning of the first fiber layer section 502 and the second fiber layer section 504 creates a first composite fiber layer 506 that is positioned on the first aesthetic fiber layer 500. In an embodiment, the second fiber layer section 504 includes a unidirectional fiber material having fibers that are positioned in a second fiber orientation (relative to the first fiber orientation of the fibers in the unidirectional fiber material of the first fiber layer section) when the second fiber layer section 504 is positioned on the first aramid fiber layer 500 adjacent the first fiber layer section 502. For example, the fibers in the unidirectional fiber material of the second fiber layer section 504 may be oriented at a 45 degree angle relative to the fiber in the first fiber layer section 502, a 90 degree angle relative to the fiber in the unidirectional fiber material of the first fiber layer section 502, and/or a variety of other angles that increase torsional strength (e.g., from 0-45 degrees) or flexure strength (e.g., 0 or 90 degrees).

Figure 5C:
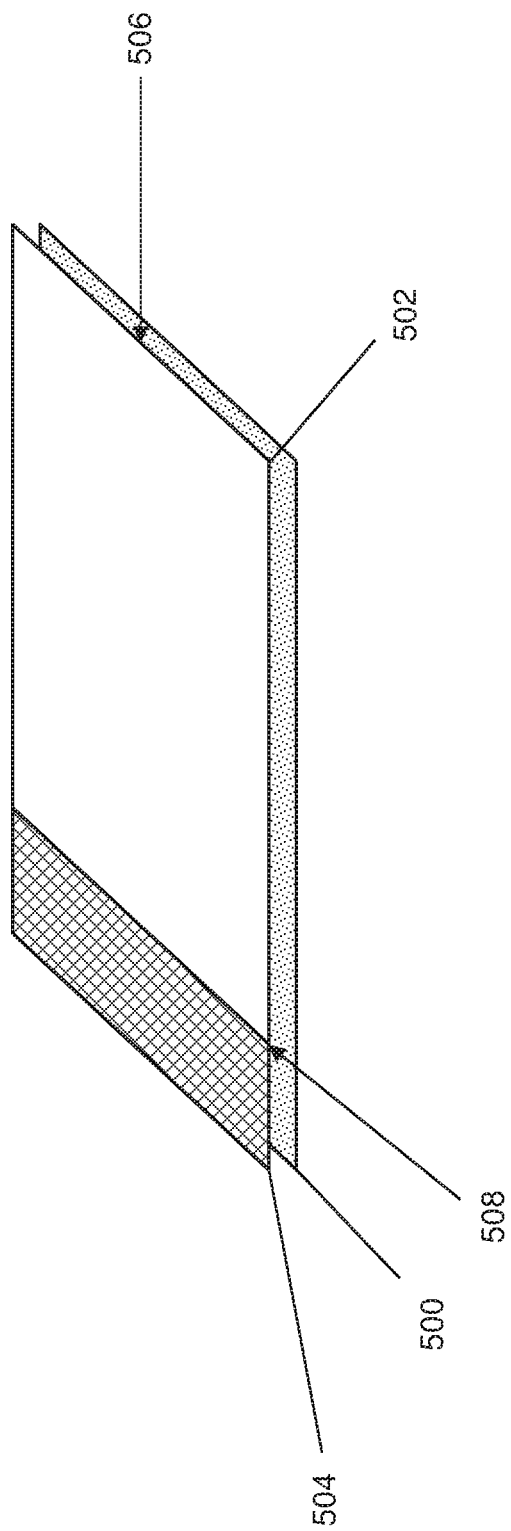
FIG. 5c is a schematic view illustrating an embodiment of the provision of a second fiber layer section of a composite fiber layer on an aesthetic layer in the method of FIG. 4.

In some embodiments, the thickness and/or tow size associated with the first fiber layer section 502 and the second fiber layer section 504 may be selected to prevent the appearance of a seam or seams at the points where the first fiber layer section 502 and the second fiber layer section 504 meet on the first composite layer 506 (e.g., along the line 508 indicated in FIG. 5c). For example, due to the fibers in the fiber materials (those that make up the first fiber layer section 502 and the second fiber layer section 504) being different, the individual thickness of the fibers in the fiber material of the first fiber layer section 502 may be selected to be different than the individual thickness of the fibers in fiber material of the second fiber layer section 504. Similarly, the tow size of the fiber material of the first fiber layer section 502 may selected to be the same as the tow size of the fiber material of the second fiber layer section 504. In a specific embodiment, the second fiber layer section 504 is solely a glass fiber material that is positioned adjacent the first fiber layer section 502 that is solely a carbon fiber material. In such an embodiment, the individual thickness of the fibers in the glass fiber material of the second fiber layer section 504 may be selected to be less than the individual thickness of the fibers in the carbon fiber material of the first fiber layer section 502, while the tow size of the glass fiber material of the second fiber layer section 504 may be selected to be the same as the tow size of the carbon fiber material of the first fiber layer section 502. While the term "tow size" does not conventionally apply to glass fibers in glass fiber materials, one of skill in the art in possession of the present disclosure will recognize that such a term refers to the number of fibers in an untwisted bundle of continuous filaments in a carbon fiber material, and that an equivalent fiber characteristic in glass fiber materials may be selected (e.g., along with an appropriate individual fiber thickness) such that any possible seam (at the points where the first fiber layer section 502 and the second fiber layer section 504 meet on the first composite layer 506) will be minimized. While the selection of individual fiber thicknesses and tow sizes has been discussed for the first composite layer 506 having a second fiber layer section 504 made solely of a glass fiber material and a first fiber layer section 502 made solely of a carbon fiber material, the selection of individual fiber thicknesses and tow sizes (or their equivalents) for any fiber materials (or combinations of materials) used in a composite layer according to the present disclosure to minimize or eliminate the appearance of seams will fall within its scope.

The method 400 then proceeds to decision block 408 where it is determined whether more composite fiber layers are to be created. If, at decision block 408, it is determined that no more composite layers are to be created (e.g., the single, first composite layer 506 is sufficient for the chassis wall 302), the method 400 proceeds to block 410, discussed in further detail below. If, at decision block 408, it is determined that more composite layers are to be created, the method 400 proceeds to block 412 where a first fiber layer section of an additional composite fiber layer is positioned on a top composite layer. In an embodiment, following the creation of a composite layer during the method 400, that composite layer will be referred to as the "top composite layer". As such, the first composite layer 506 created at blocks 404 and 406 of the method 400 is now the top composite layer 506 for purposes of the discussion of blocks 412 and 414 of the method 400. In an embodiment, at block 412, a first fiber layer section 510 that includes the carbon fiber material is positioned on the first fiber layer section 502 of the top composite layer 506 using the chassis wall creation system and methods known in the art. In an embodiment, the first fiber layer section 510 includes a unidirectional fiber material having fibers that are positioned in the same fiber orientation as the first fiber layer section 502. In other embodiments, the first fiber layer section 510 includes a unidirectional fiber material having fibers that are positioned in a 90 degree rotated orientation relative to the first fiber layer section 502. In other embodiments. In some examples, the first fiber layer section 510 may be solely a carbon fiber material, while in other examples, the first fiber layer section 510 may include the carbon fiber materials along with additional materials.

The method 400 then proceeds to block 414 where a second fiber layer section of the additional composite fiber layer is positioned on the second fiber layer section of the top composite layer. In an embodiment, a second fiber layer section 512 that is free of the carbon fiber material and that may include a glass fiber material, a polymer fiber material, a ceramic fiber materials, combinations thereof and/or other non-carbon fiber materials known in the art, is positioned on the second fiber layer section 504 of the top composite layer 506 and adjacent the first fiber layer section 510 using the chassis wall creation system and methods known in the art. In an embodiment, the positioning of the first fiber layer section 510 and the second fiber layer section 512 creates an additional composite fiber layer 514 that is positioned on the top composite fiber layer 506. In an embodiment, the second fiber layer section 512 includes a unidirectional fiber material having fibers that are positioned in the same fiber orientation as the second fiber layer section 504. In some embodiments, the thickness and/or tow size associated with the first fiber layer section 512 and the second fiber layer section 510 may be selected to prevent the appearance of a seam at the points where the first fiber layer section 510 and the second fiber layer section 512 meet on the additional composite layer 514 in substantially the same manner as discussed above for the first composite layer 506.

The method 400 then proceeds to decision block 416 where it is determined whether more composite fiber layers are to be created. If, at decision block 416, it is determined that more composite layers are to be created, the method 400 proceeds back to block 412 and 414. In such embodiments, the additional composite fiber layer 514 becomes the top composite fiber layer, and an additional composite fiber layer may be provided on that composite fiber layer substantially as discussed above. In the embodiment illustrated in FIG. 5d, decision block 408 has resulted in the provision of composite fiber layers 516 and 518 in substantially the same manner as discussed above for composite fiber layer 514. One of skill in the art in possession of the present disclosure will recognize that any number of composite fiber layers may be provided during the method 400, and number of composite fiber layers provided will depend on the requirements of the IHS chassis 300 and chassis wall 302.

Figure 5D:
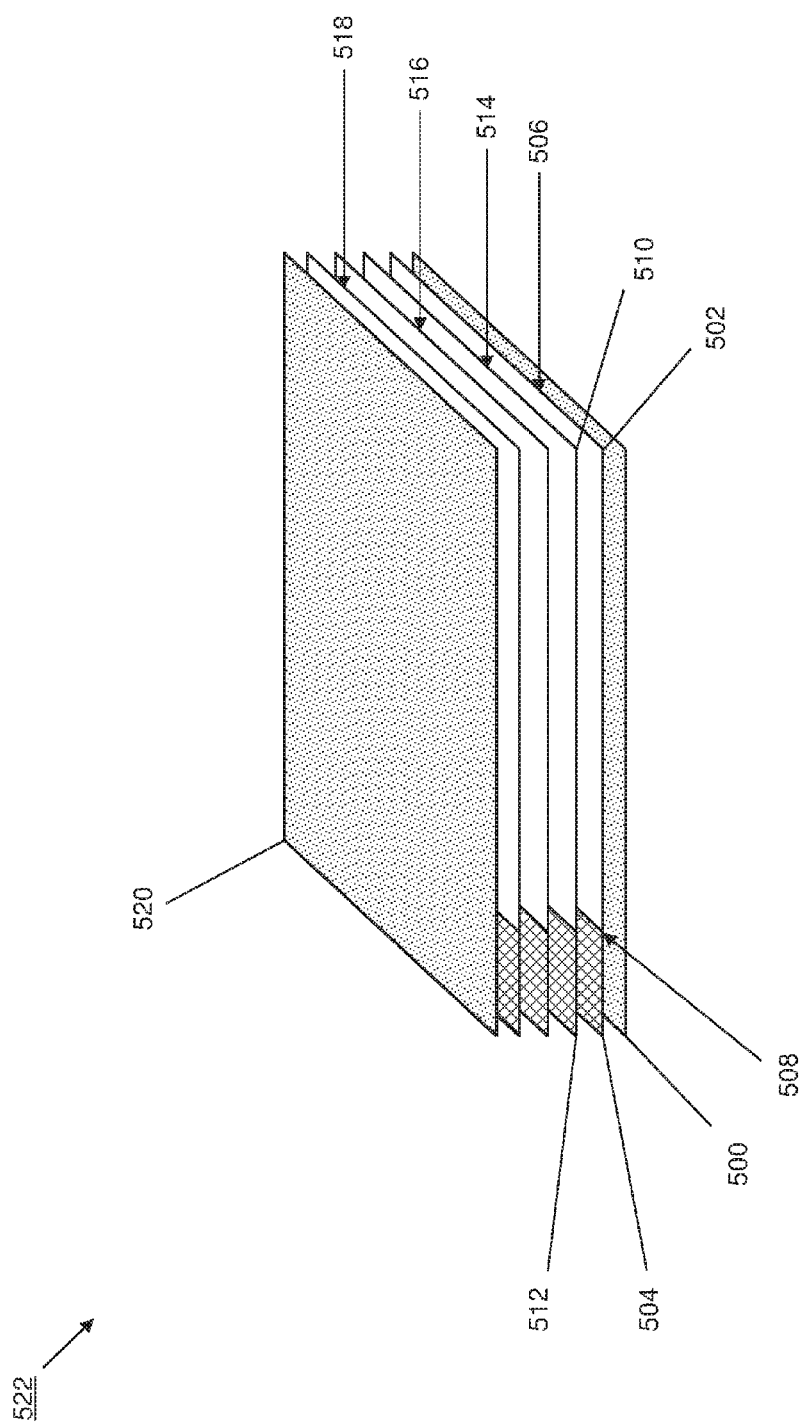
FIG. 5d is a schematic view illustrating an embodiment of the provision of a plurality of composite fiber layer between aesthetic layers in the method of FIG. 4.

If, at decision block 416 or decision block 408, it is determined that no more composite layers are to be created, the method 400 proceeds to block 410 where a second aesthetic fiber layer is positioned on the top composite fiber layer. In an embodiment, a second aesthetic fiber layer 520 is provided in the top composite fiber layer 518 using the chassis wall creation system and methods known in the art, as illustrated in FIG. 5d. The provision of the second aesthetic fiber layer 520 provides a chassis wall 522, which may be the chassis wall 302 discussed above with reference to FIG. 3a, that includes the second aesthetic fiber layer 520 providing the outer surface 302a, and the first aesthetic layer 500 providing the inner surface 302b. In addition, as can be seen in FIG. 5d, the composite fiber layers 506, 514, 516, and 518 are stacked such that the second fiber layer sections (e.g., 504 and 512) provide the wireless transmission window 308. In some embodiments, the antenna 306 may be embedded in the wireless transmission window of the chassis wall 522 during the method 400 (e.g., between composite fiber layers, between a composite fiber layer and an aesthetic fiber layer, etc.) As is known in the art, resins, molds, and/or other fiber wall provisioning equipment and materials may be used during the method 400 to provide the chassis wall 522. In an embodiment, silica loaded resins may be used to increase the stiffness of the chassis wall 522 relative to conventional resins. In addition, the aesthetic fiber layers 500 and 520 may be painted or otherwise treated to include a desired aesthetic characteristic. In some embodiments, only one aesthetic fiber layer may be provided (e.g., only the aesthetic fiber layer providing the outer surface 302a of the chassis wall 302) in the method 400.

Referring first to FIGS. 6a, 6b, 7a, 7b, 7c, 7d, 7e, and 7f, a method 600 for providing a wireless transmission window in a chassis wall is illustrated. The method 600a, illustrated in FIG. 6a, describes the provision of composite fiber layer(s) that include a first fiber layer section with a weaved carbon fiber material and non-carbon fiber material, with a second carbon fiber layer section(s) that extends from the first fiber layer section and includes only the non-carbon fiber material. The method 600b, illustrated in FIG. 6b, describes the stacking the composite fiber layers, which may be provided according to the method 600a, such that the non-carbon fiber layer sections align. The methods 600a and 600b are directed to creating the chassis wall 302 of the IHS chassis 300 illustrated in FIG. 3b, and specifically to creating the wireless transmission window 310 for the antenna 306 and the wireless transmission window 316 for the antenna 312. However, as discussed below, the techniques described in the methods 600a and 600b may be used for differently positioned antennas, and/or combined with the methods 400 and 800 discussed herein while remaining within the scope of the present disclosure.

Figure 6A:
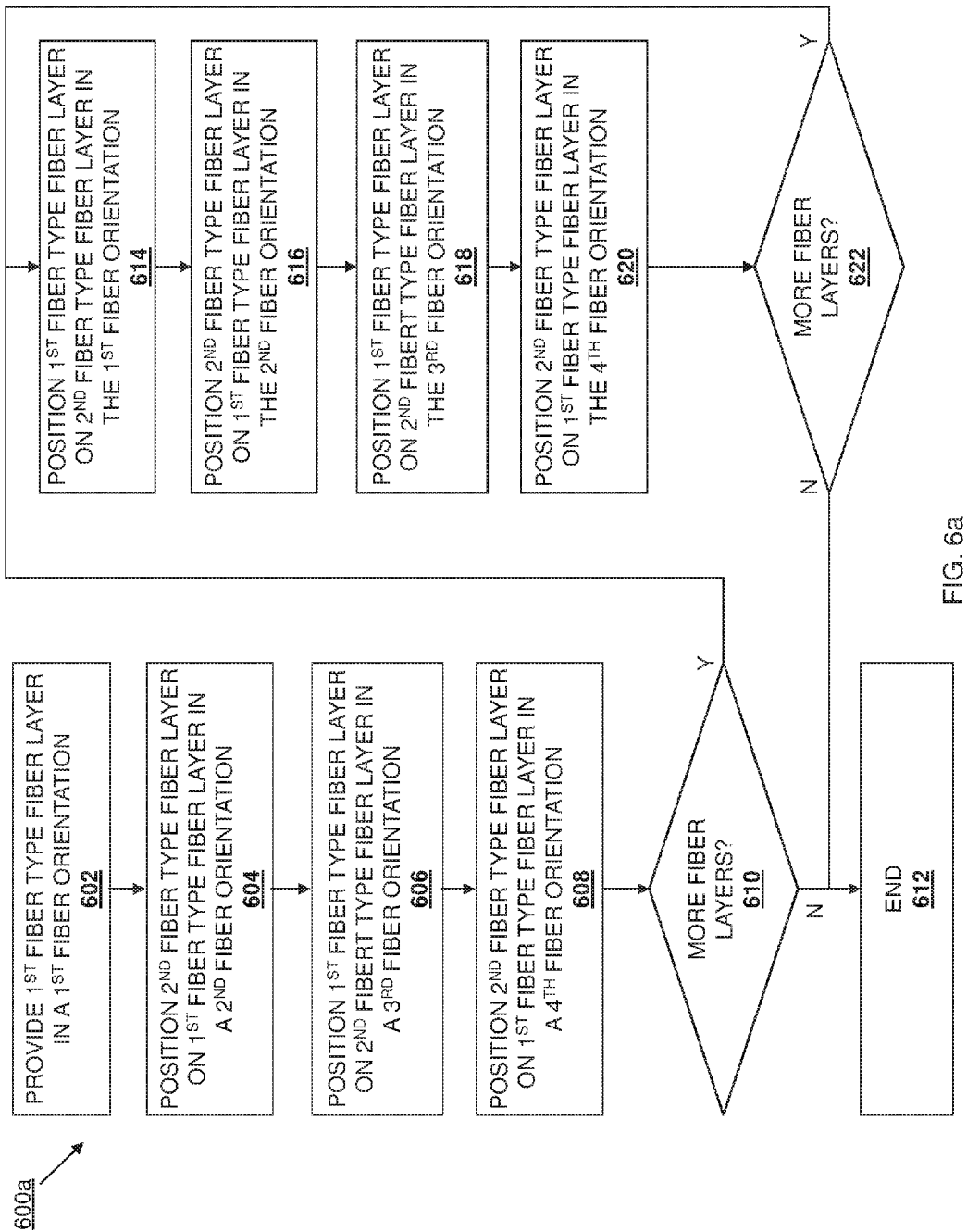
FIG. 6a is a flow chart view illustrating an embodiment of a portion of method for providing wireless transmission windows in a chassis wall.
Figure 7A:
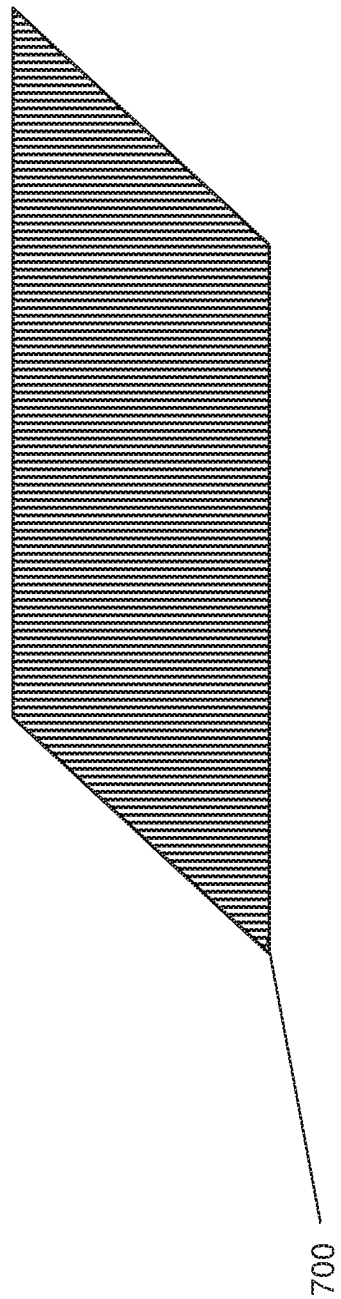

Referring first to FIGS. 6a and 7a, the method 600a begins at block 602 where a first fiber type fiber layer is provided in a first fiber orientation. In an embodiment, a first fiber type fiber layer 700 is a carbon fiber layer provided in a chassis wall creation system, as illustrated in FIG. 7a. In an embodiment, the first fiber type fiber layer 700 includes a unidirectional carbon fiber material having fibers that are positioned in a first fiber orientation (referred to as a 0° fiber orientation below). In some examples, the first fiber type fiber layer 700 may be solely a carbon fiber material, while in other examples, the first fiber type fiber layer 700 may include the carbon fiber materials along with additional materials.

Figure 7B:
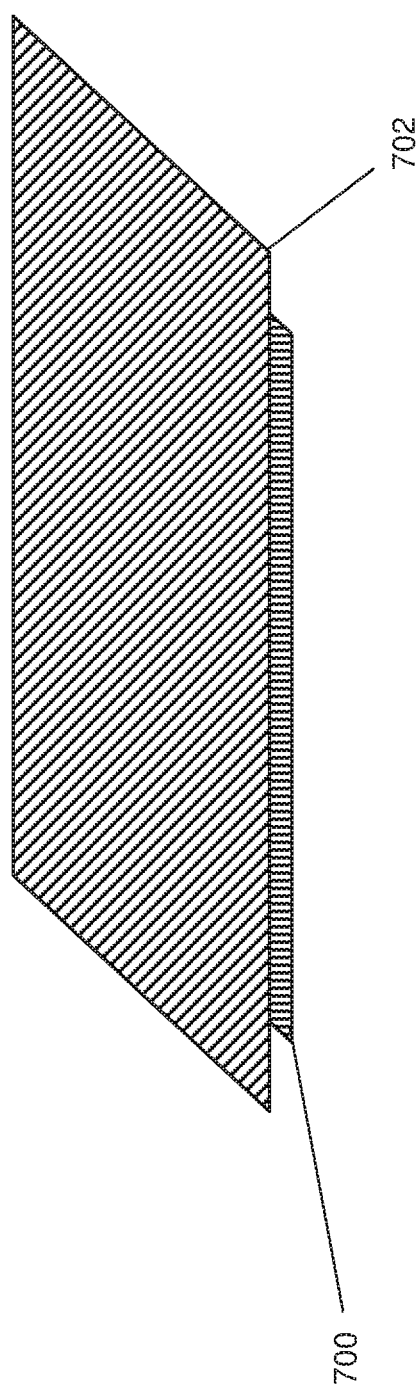

Referring now to FIGS. 6a and 7b, the method 600a then proceeds to block 604 where a second fiber type fiber layer is positioned on the first fiber type fiber layer in a second fiber orientation. In an embodiment, a second fiber type fiber layer 702 that is free of the carbon fiber material and that may include a glass fiber material, a polymer fiber material, a ceramic fiber materials, combinations thereof, and/or other non-carbon fiber materials known in the art, is positioned on the first fiber type fiber layer 700 using the chassis wall creation system and methods known in the art. In an embodiment, the second fiber type fiber layer 702 may include a fiber material that has a higher dielectric constant and higher resistivity than the carbon fiber material used in the first fiber type fiber layer. In an embodiment, the second fiber type fiber layer 702 includes a unidirectional glass fiber material having fibers that are positioned in a second fiber orientation relative to the first fiber orientation. For example, fibers in the fiber material of the second fiber type fiber layer 702 may be oriented at a 45° fiber orientation relative to the 0° fiber orientation of the fibers in the fiber material of the first fiber type fiber layer 700. In other embodiments, the fibers in the fiber material of the second fiber type fiber layer 702 may be oriented at any variety of other angles relative to the fibers in the fiber material of the first fiber type fiber layer 700 to increase direction strength of the chassis wall. As can be seen, the second fiber type fiber layer 702 is sized such that the ends of the second fiber type fiber layer 702 extend past the ends of the first fiber type fiber layer 700.

Figure 7C:
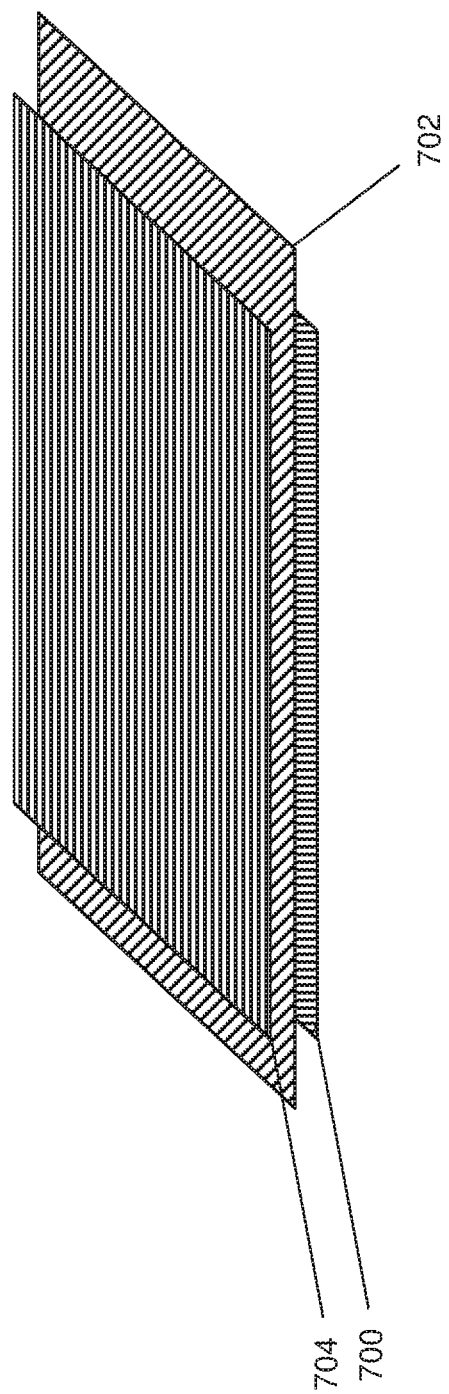
Figure 7D:
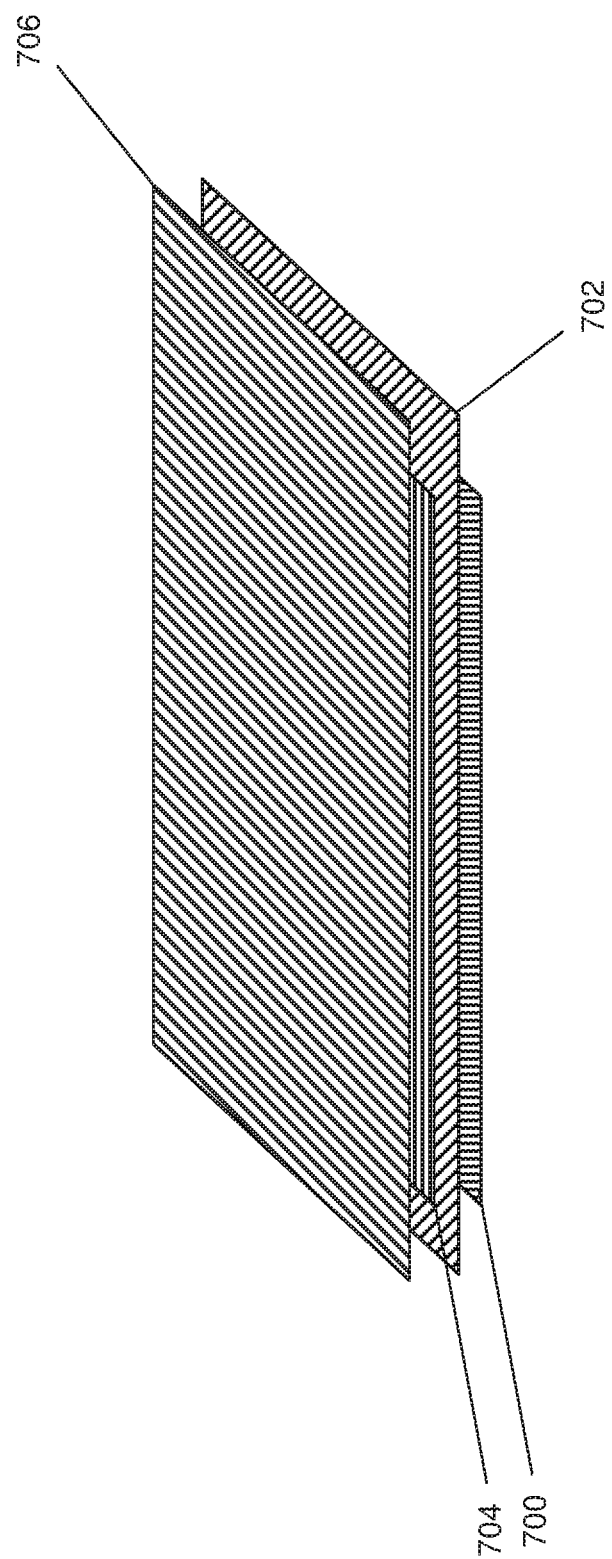

Referring now to FIGS. 6*a* and 7*c*, the method 600*a* then proceeds to block 606 where a first fiber type fiber layer is positioned on the second fiber type fiber layer in a third fiber orientation. In an embodiment, a first fiber type fiber layer 704 that includes the same fiber material(s) as the first fiber type fiber layer 700 is positioned on the second fiber type fiber layer 702 using the chassis wall creation system and methods known in the art. In an embodiment, the first fiber type fiber layer 704 includes a unidirectional carbon fiber material having fibers that are positioned in a third fiber orientation relative to the first fiber orientation. For example, fibers in the fiber material of the first fiber type fiber layer 704 may be oriented at a 90° fiber orientation relative to the 0° fiber orientation of the fibers in the fiber material of the first fiber type fiber layer 700. In other embodiments, the fibers in the fiber material of the first fiber type fiber layer 704 may be oriented at any variety of other angles relative to the fibers in the fiber material of the first fiber type fiber layer 700 to match fiber layer appearances and/or provide processing benefits. As can be seen, the first fiber type fiber layer 704 is sized similarly to the first fiber type fiber layer 700 such that the ends of the second fiber type fiber layer 702 extend past the ends of the first fiber type fiber layer 704 as well.

Referring now to FIGS. 6*a* and 7*b*, the method 600*a* then proceeds to block 608 where a second fiber type fiber layer is positioned on the first fiber type fiber layer in a fourth fiber orientation. In an embodiment, a second fiber type fiber layer 706 that includes the same fiber material(s) as the second fiber type fiber layer 702, is positioned on the first fiber type fiber layer 704 using the chassis wall creation system and methods known in the art. In an embodiment, the second fiber type fiber layer 706 includes a unidirectional glass fiber material having fibers that are positioned in a fourth fiber orientation relative to the first fiber orientation. For example, fibers in the fiber material of the second fiber type fiber layer 706 may be oriented at a 135° fiber orientation relative to the 0° fiber orientation of the fibers in the fiber material of the first fiber type fiber layer 700. In other embodiments, the fibers in the fiber material of the second fiber type fiber layer 706 may be oriented at any variety of other angles relative to the fibers in the fiber material of the first fiber type fiber layer 700 to match fiber layer appearances. As can be seen, the second fiber type fiber layer 706 is sized similarly to the second fiber type fiber layer 702 such that the ends of the second fiber type fiber layer 706 extend past the ends of the first fiber type fiber layers 700 and 704.

Figure 7E:
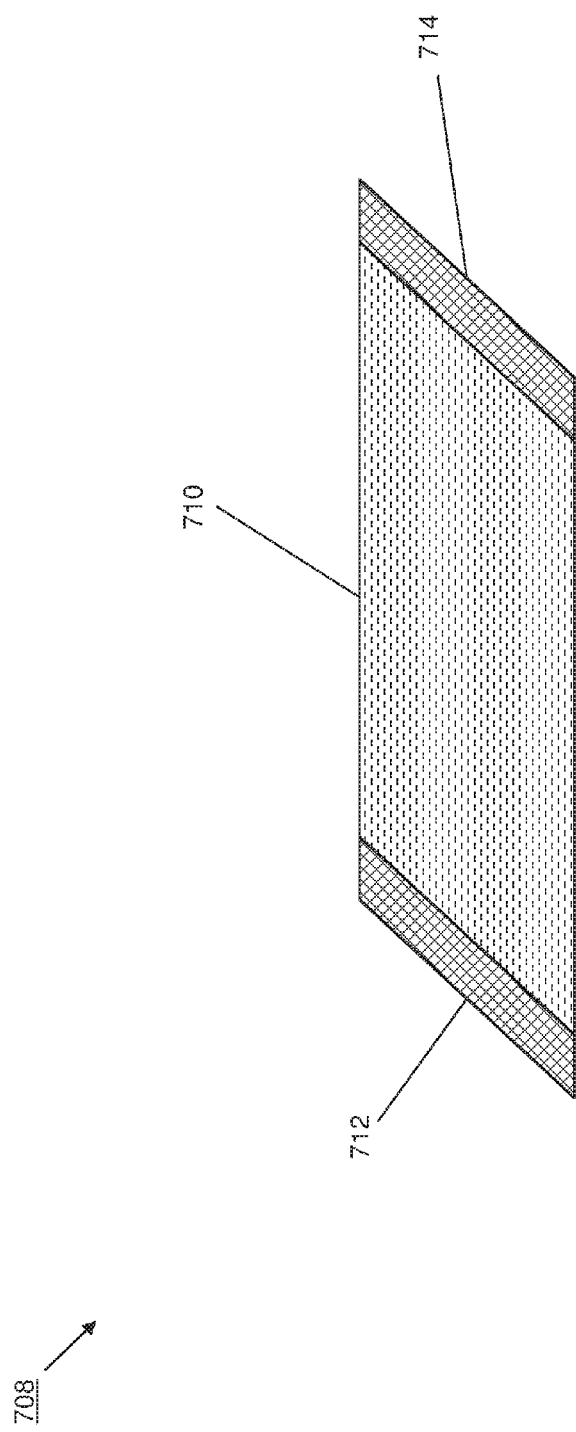

The method 600*a* then proceeds to decision block 610 where it is determined whether to include more fiber layers on the composite fiber layer being provided. If, at decision block 610, it is determined that no more fiber layers should be included on the composite fiber layer being provided, the method 600*a* proceeds to blocks 612 where the method 600*a* ends. FIG. 7*e* illustrates a composite fiber layer 708 that may have been created during blocks 602, 604, 606, 608, 610, and 612 of the method 600*a*. The composite fiber layer 708 includes a first fiber layer section 710 that includes the first fiber type fiber layers 700 and 704 cross weaved with the second fiber type fiber layers 702 and 706 as described above. The composite fiber layer 708 also includes a pair of second fiber layer sections 712 and 714 that include the portions of the second fiber type fiber layers 702 and 706 that extend past the first fiber type fiber layers 700 and 704, cross weaved with each other as described above. As is known in the art, resins, molds, and/or other fiber wall provisioning equipment and materials may be used during the method 600*a* to provide the composite fiber layer 708.

If, at decision block 610, it is determined that more fiber layers should be provided on the composite fiber layer being created, the method 600*a* proceeds to blocks 614, 616, 618, and 620, where additional fiber layers are provided. In an embodiment of block 614, a first fiber type fiber layer is positioned on the second fiber type fiber layer in the first fiber orientation. For example, a first fiber type fiber layer may be orientated substantially as illustrated in FIG. 7*a* and positioned on the second fiber type fiber layer 706 illustrated in FIG. 7*d*. In an embodiment of block 616, a second fiber type fiber layer is positioned on the first fiber type fiber layer in the second fiber orientation substantially as described above with reference to block 604. In an embodiment of block 618, a first fiber type fiber layer is positioned on the second fiber type fiber layer in the third fiber orientation substantially as described above with reference to block 606. In an embodiment of block 620, a second fiber type fiber layer is positioned on the first fiber type fiber layer in the fourth fiber orientation substantially as described above with reference to block 608.

The method 600*a* then proceeds to decision block 622 where it is determined whether to provide more fiber layers should be included on the composite fiber layer being provided. If, at decision block 622, it is determined that more fiber layers should be included on the composite fiber layer being provided, the method 600*a* returns to blocks 614, 616, 618, and 620, where additional fiber layers are provided substantially as described above. If, at decision block 622, it is determined that no more fiber layers should be included on the composite fiber layer being provided, the method 600*a* proceeds to blocks 612 where the method 600*a* ends. FIG. 7*e* illustrates a composite fiber layer 708 that may have been created during blocks 602, 604, 606, 608, 610, 614, 616, 618, 620, and 622 of the method 600*a*. The composite fiber layer 708 includes a first fiber layer section 710 that includes the first fiber type fiber layers 700, 704, and any additional first fiber type fiber layers cross weaved with the second fiber type fiber layers 702, 706, and any additional second fiber type fiber layers as described above. The composite fiber layer 708 also includes a pair of second fiber layer sections 712 and 714 that include the portions of the second fiber type fiber layers 702, 706 and any additional second fiber type fiber layers that extend past the first fiber type fiber layers 700, 704, and any additional first fiber type fiber layers, cross weaved with each other as described above. As is known in the art, resins, molds, and/or other fiber wall provisioning equipment and materials may be used during the method 600*a* to provide the composite fiber layer 708.

Figure 6B:
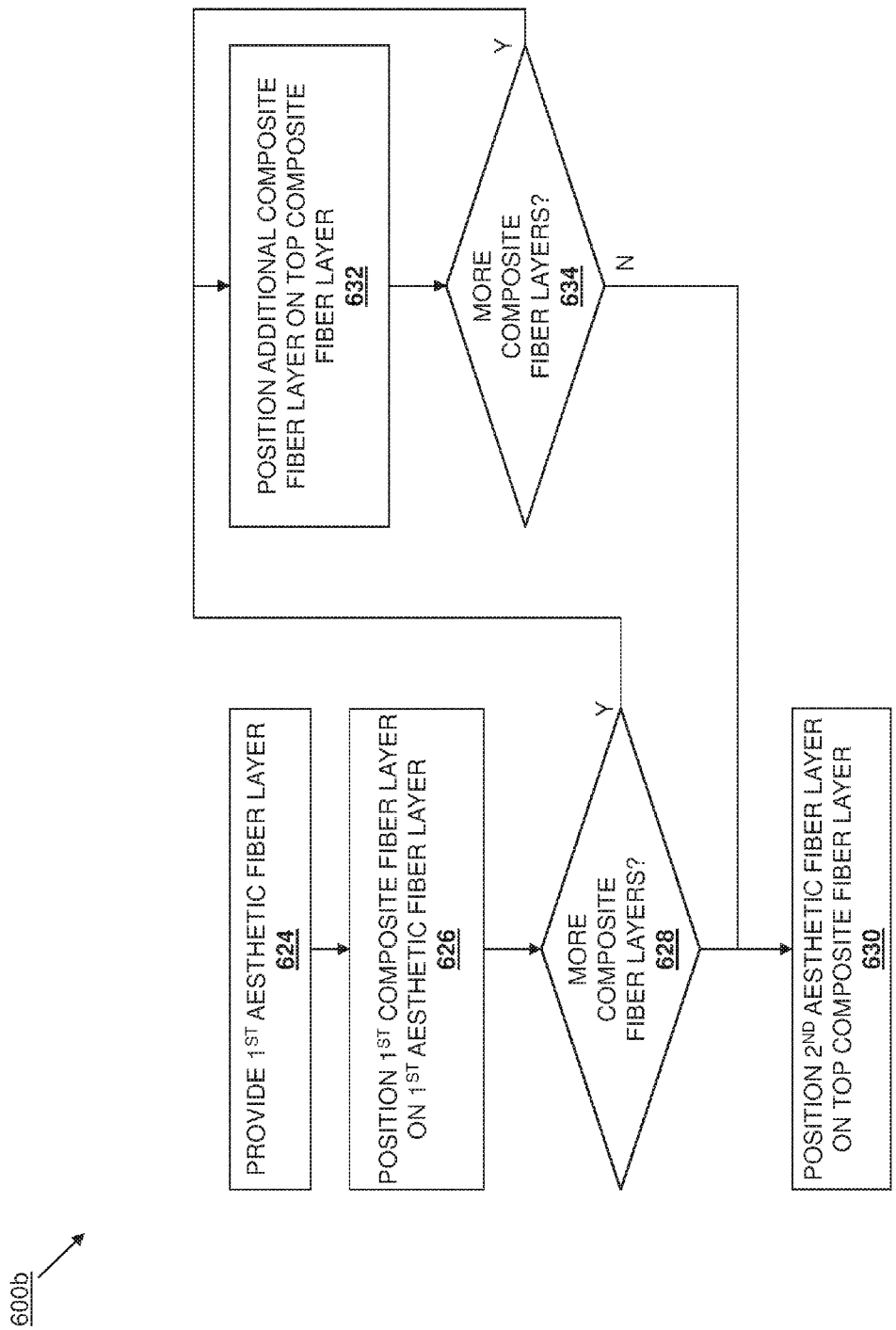
FIG. 6b is a flow chart view illustrating an embodiment of a portion of method for providing wireless transmission windows in a chassis wall.

Referring now to FIGS. 6*b* and 7*f*, the method 600*b* begins at block 624 where a first aesthetic fiber layer is provided. In an embodiment, a first aesthetic fiber layer 716 is provided in a chassis wall creation system. The method 600b then proceeds to block 626 where a first composite fiber layer is positioned on the first aesthetic fiber layer. In an embodiment, a first composite fiber layer 708a, which may be created according to the method 600a, is positioned on the first aesthetic fiber layer 716 using the chassis wall creation system and methods known in the art. The method 600b then proceeds to decision block 628 where it is determined whether more composite fiber layers are to be provided. If, at decision block 628, it is determined that no more composite layers are to be provided (e.g., the single, first composite fiber layer 708a is sufficient for the chassis wall 302), the method 600b proceeds to block 630, discussed in further detail below. If, at decision block 628, it is determined that more composite layers are to be provided, the method 600b proceeds to block 632 where an additional composite fiber layer is positioned on a top composite fiber layer. In an embodiment, following the provision of a composite fiber layer during the method 600b, that composite fiber layer will be referred to as the "top composite fiber layer". As such, the composite fiber layer 708a provided at block 626 of the method 600b is now the top composite layer 600b for purposes of the discussion of block 632 of the method 600b. In an embodiment, at block 632, an additional composite fiber layer 708b, which may be created according to the method 600a, is positioned on the top composite fiber layer 708a using the chassis wall creation system and methods known in the art. The method 600b then proceeds to decision block 634 where it is determined whether more composite fiber layers are to be provided. If, at decision block 634, it is determined that more composite fiber layers are to be provided, the method 600b proceeds back to block 632. In such embodiments, the additional composite fiber layer 708b becomes the top composite fiber layer, and an additional composite fiber layer may be provided on that composite fiber layer. In the embodiment illustrated in FIG. 7f, decision block 634 has resulted in the provision of composite fiber layer 708c in substantially the same manner as discussed above for composite fiber layer 708b. One of skill in the art in possession of the present disclosure will recognize that any number of composite fiber layers may be provided during the method 600b, and number of composite fiber layers provided will depend on the requirements of the IHS chassis 300 and chassis wall 302.

If, at decision block 628 or decision block 634, it is determined that no more composite fiber layers are to be provided, the method 600b proceeds to block 630 where a second aesthetic fiber layer is positioned on the top composite fiber layer. In an embodiment, a second aesthetic fiber layer 718 is provided in the top composite fiber layer 708c using the chassis wall creation system and methods known in the art, as illustrated in FIG. 7f. The provision of the second aesthetic fiber layer 718 provides a chassis wall 720, which may be the chassis wall 302 discussed above with reference to FIG. 3b, that includes the second aesthetic fiber layer 718 providing the outer surface 302a, the first aesthetic layer 716 providing the inner surface 302b. In addition, as can be seen in FIG. 7f, the composite fiber layers 708a, 708b, and 708c are stacked such that the second fiber layer sections on each composite fiber layer 708a, 708b, and 708c (e.g., 712 and 714, illustrated in FIG. 7e) provide the wireless transmission windows 314 and 316. In some embodiments, the antennae 310 and 312 may be embedded in the wireless transmission windows on the chassis wall 720 during the method 600b (e.g., between composite fiber layers, between a composite fiber layer and an aesthetic fiber layer, etc.) As is known in the art, resins, molds, and/or other fiber wall provisioning equipment and materials may be used during the method 600b to provide the chassis wall 720. In an embodiment, silica loaded resins may be used to increase the stiffness of the chassis wall 720 relative to conventional resins. In addition, the aesthetic fiber layers 716 and 718 may be painted or otherwise treated to include a desired aesthetic characteristic. In some embodiments, only one aesthetic fiber layer may be provided (e.g., only the aesthetic fiber layer providing the outer surface 302a of the chassis wall 302) in the method 600b.

Referring first to FIGS. 8, 9a, 9b, 9c, 9d, 9e, and 9f, a method 800 for providing a wireless transmission window in a chassis wall is illustrated. The method 800 describes the creation of a wireless transmission window in a chassis wall by positioning a plurality of first fiber layer sections including a carbon fiber material and defining second fiber layer areas, and at least one second carbon fiber layer section including a non-carbon fiber material on at least one of those second fiber layer areas. The method 800 is directed to creating the chassis wall 302 of the IHS chassis 300 illustrated in FIG. 3c, and specifically to creating the wireless transmission window 320 for the antenna 318. However, as discussed below, the techniques described in the method 800 may be used for differently positioned antennas, and/or combined with the methods 400 and 600 discussed below while remaining within the scope of the present disclosure.

Figure 8:
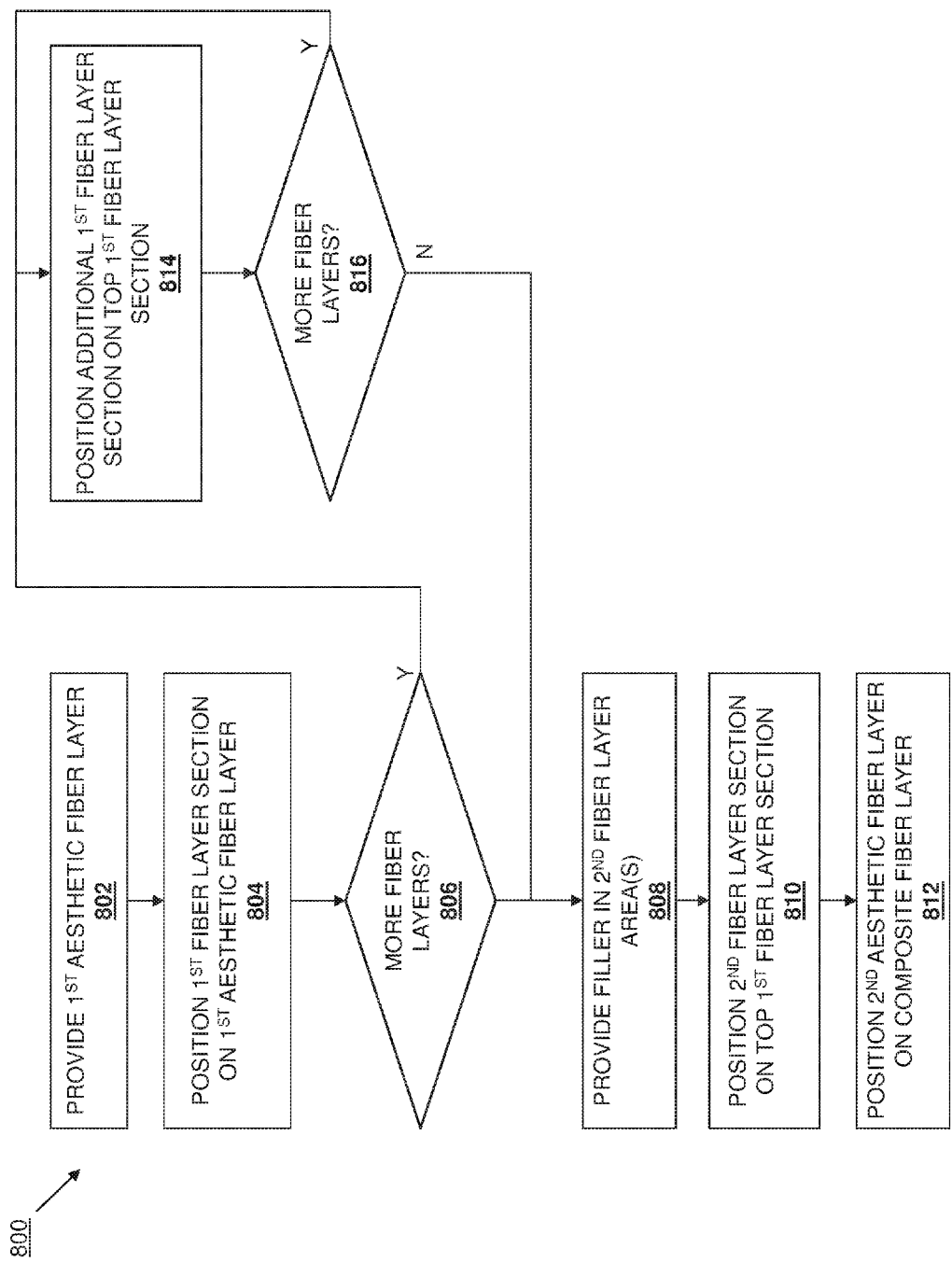
FIG. 8 is a flow chart view illustrating an embodiment of a method for providing a wireless transmission window in a chassis wall.
Figure 9A:
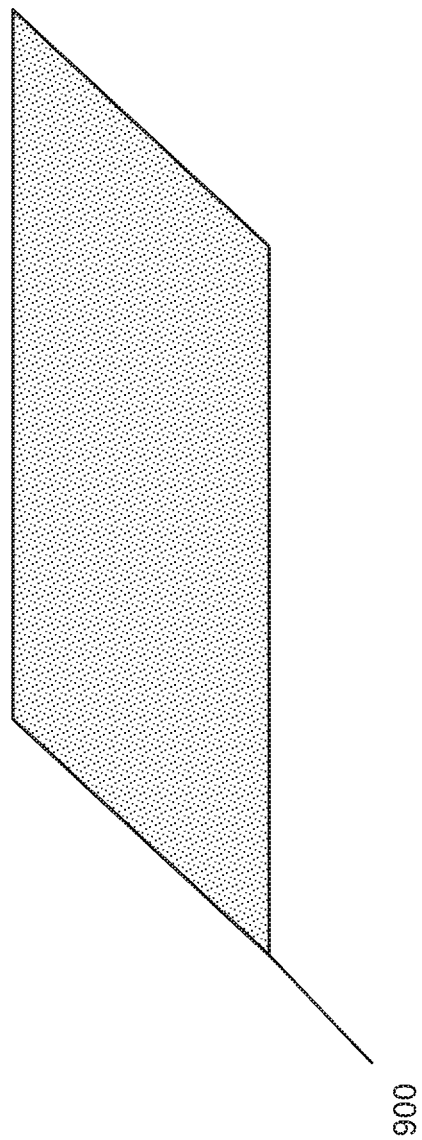
FIG. 9a is a schematic view illustrating an embodiment of the provision of a first aesthetic layer in the method of FIG. 8.
Figure 9B:
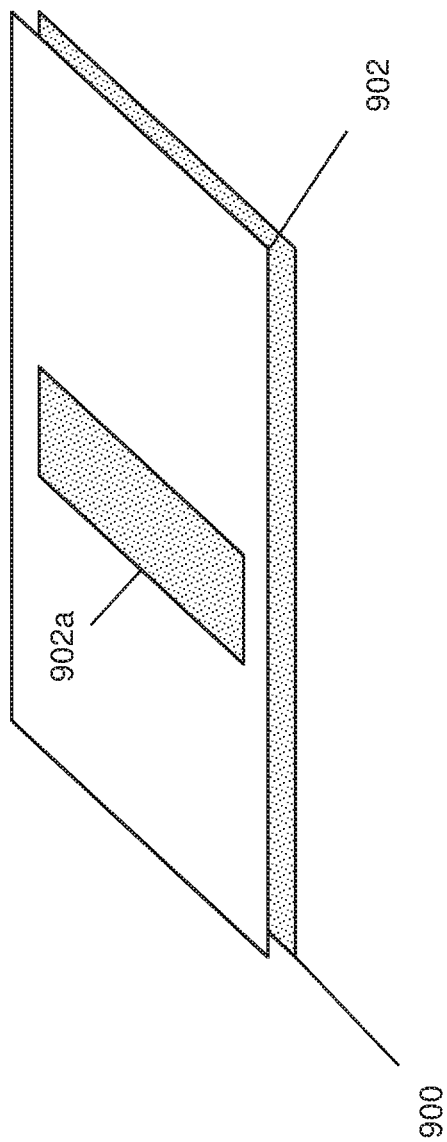
FIG. 9b is a schematic view illustrating an embodiment of the provision of a first fiber layer section of a first composite fiber layer on an aesthetic layer in the method of FIG. 8.
Figure 9C:
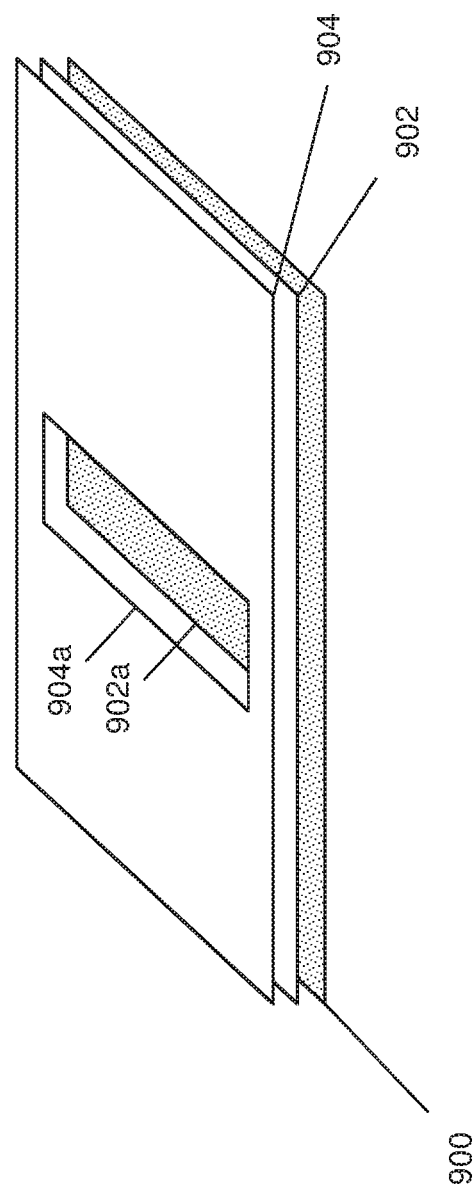
FIG. 9c is a schematic view illustrating an embodiment of the provision of a first fiber layer section of a second composite fiber layer on a first composite fiber layer in the method of FIG. 8.

Referring first to FIGS. 8, 9a, and 9b, the method 800 begins at block 802 where a first aesthetic fiber layer is provided. In an embodiment, a first aesthetic fiber layer 900 is provided in a chassis wall creation system, as illustrated in FIG. 9a. The method 800 then proceeds to block 804 where a first fiber layer section is positioned on the first aesthetic fiber layer. In the illustrated embodiment, a first fiber layer section 902 defines a second fiber layer area 902a that is substantially centrally located on the first fiber layer section 902. In an embodiment, the first fiber layer section 902 includes a carbon fiber material and is positioned on the first aesthetic fiber layer 900 using the chassis wall creation system and methods known in the art. In an embodiment, the first fiber layer section 902 includes a unidirectional fiber material having fibers that are positioned in a first fiber orientation when the first fiber layer section 902 is positioned on the first aramid fiber layer 900. In some examples, the first fiber layer section 902 may be solely a carbon fiber material, while in other examples, the first fiber layer section 902 may include the carbon fiber materials along with additional materials.

The method 800 then proceeds to decision block 806 where it is determined whether more fiber layers are to be provided. If, at decision block 408, it is determined that no more fibers layers are to be provided, the method 800 proceeds to blocks 808, 810, and 812, discussed in further detail below. If, at decision block 806, it is determined that more fiber layers are to be provided, the method 800 proceeds to block 814 where an additional first fiber layer section is positioned on a top first fiber layer section. In an embodiment, following the positioning of a first fiber layer section during the method 800, that first fiber layer section will be referred to as the "top first fiber layer section". As such, the first fiber layer section 902 provided at block 804 of the method 800 is now the top fiber layer section 902 for purposes of the discussion of block 814 of the method 800. In an embodiment, at block 814, an additional first fiber layer section 904 defines a second fiber layer area 904a that is substantially centrally located on the additional first fiber layer section 904. In an embodiment, the additional first fiber layer section 904 includes a carbon fiber material and is positioned on the top first fiber layer section 902 using the chassis wall creation system and methods known in the art. In an embodiment, the additional first fiber layer section 904 includes a unidirectional fiber material having fibers that are positioned in the same fiber orientation as the top first fiber layer 902. In some examples, the additional first fiber layer section 904 may be solely a carbon fiber material, while in other examples, the additional first fiber layer section 904 may include the carbon fiber materials along with additional materials.

The method 400 then proceeds to decision block 816 where it is determined whether more fiber layers are to be provided. If, at decision block 816, it is determined that more fiber layers are to be provided, the method 800 proceeds back to block 814. In such embodiments, the additional first fiber layer section 904 becomes the top first fiber layer section 904, and an additional first fiber layer section may be provided on that top first fiber layer section. In the embodiment illustrated in FIGS. 9d, 9e, and 9f, decision block 816 has resulted in the provision of first fiber layer section 906 (with first fiber layer section 906 including second fiber layer area 906a) in substantially the same manner as discussed above for first fiber layer section 904. One of skill in the art in possession of the present disclosure will recognize that any number of first fiber layer sections may be provided during the method 800, and the number of fiber layer sections provided will depend on the requirements of the IHS chassis 300 and chassis wall 302.

Figure 9D:
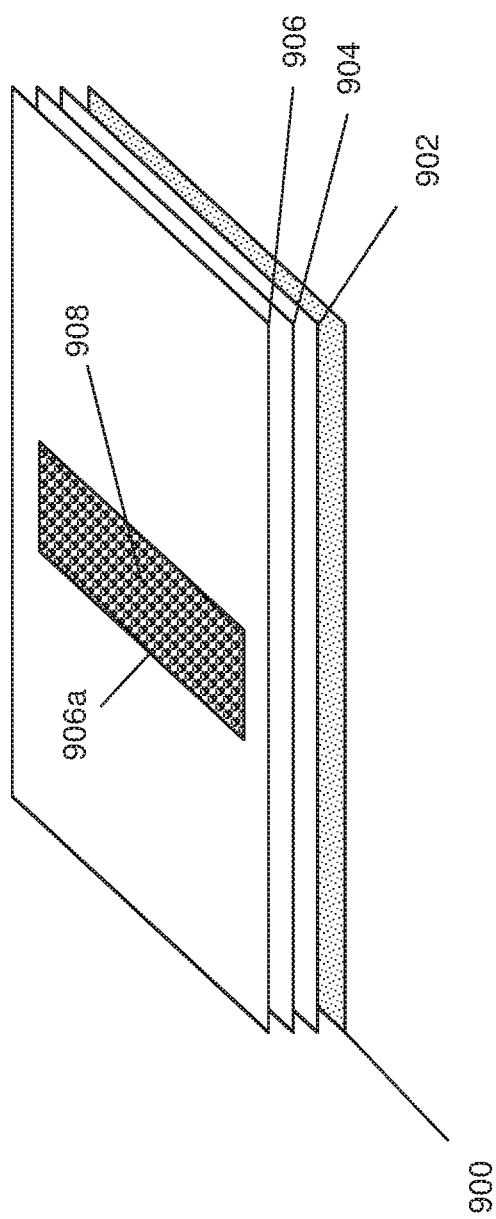
FIG. 9d is a schematic view illustrating an embodiment of the provision of a filler in the second fiber layer sections of a plurality of composite fiber layers in the method of FIG. 8.
Figure 9E:
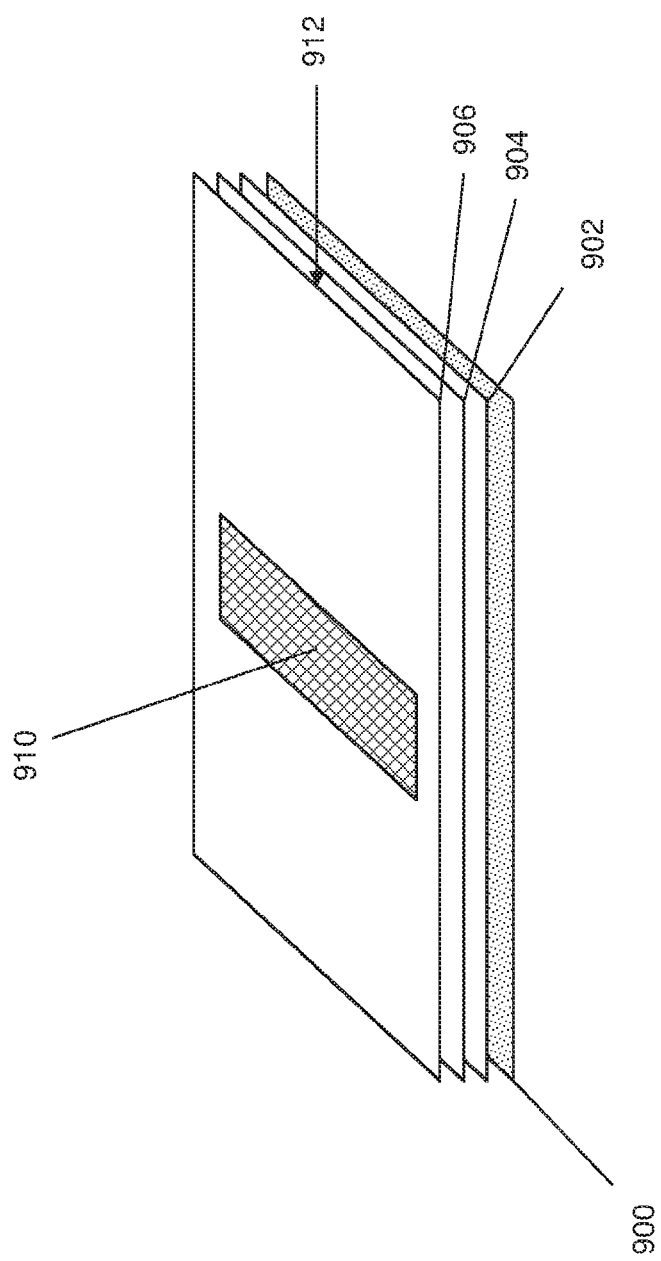
FIG. 9e is a schematic view illustrating an embodiment of the provision of a first fiber layer section and a second fiber layer section of a third composite fiber layer on a second composite fiber layer in the method of FIG. 8.

If, at decision block 816 or decision block 806, it is determined that no more fiber layers are to be provided, the method 800 proceeds to block 808 where a filler is provided in the second fiber layer areas. In an embodiment of block 808, a resin 908 is provided that fills the second fiber layer areas 902a, 904a, and 906a of the first fiber layer sections 902, 904, and/or 906, respectively, as illustrated in FIG. 9d. The method 800 then proceeds to block 810 where a second fiber layer section is positioned on the top first fiber layer section. In an embodiment, a second fiber layer section 910 that is free of the carbon fiber material and that may include a glass fiber material, a polymer fiber material, a ceramic fiber materials, combinations thereof, and/or other non-carbon fiber materials known in the art, is positioned in the second fiber layer area 906a of the first fiber layer section 906 using the chassis wall creation system and methods known in the art. In an embodiment, the second fiber layer section 910 may include a fiber material that has a higher dielectric constant and higher resistivity than the carbon fiber material used in the first fiber layer sections. In an embodiment, the positioning of the first fiber layer section 906 and the second fiber layer section 910 creates a composite fiber layer 912 that is positioned on top of the first fiber layer sections 902 and 904 with filler in their respective second fiber layer areas 902a and 904a. In an embodiment, the second fiber layer section 910 includes a unidirectional fiber material having fibers that are positioned in a second fiber orientation (relative to the first fiber orientation of the fibers in the unidirectional fiber material of the first fiber layer section 906) when the second fiber layer section 910 is positioned in the second fiber layer area 906a of the first fiber layer section 906. For example, the fibers in the unidirectional fiber material of the second fiber layer section 910 may be oriented at a 45 degree angle relative to the fiber in the unidirectional fiber material of the first fiber layer section 906, a 90 degree angle relative to the fiber in the unidirectional fiber material of the first fiber layer section 906, and/or a variety of other angles that would increase torsional stiffness based on the mismatched orientation.

Figure 9F:
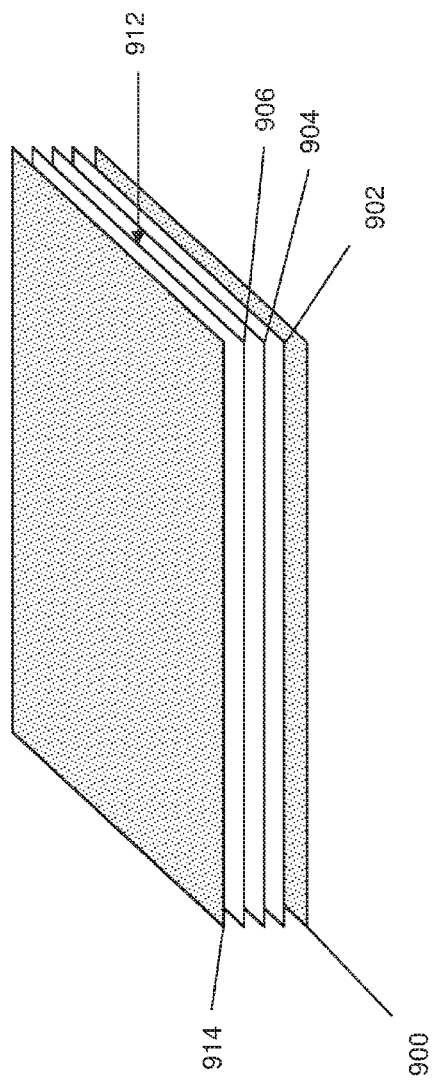
FIG. 9f is a schematic view illustrating an embodiment of the provision of a second aesthetic layer on a third composite fiber layer in the method of FIG. 8.

In some embodiments, the thickness and/or tow size associated with the first fiber layer section 906 and the second fiber layer section 910 may be selected to prevent the appearance of a seam at the points where the first fiber layer section 906 and the second fiber layer section 910 meet on the first composite fiber layer 912 (e.g., the rectangle illustrated in FIG. 9e), substantially similarly as described above for the method 400. The method 800 then proceeds to block 812 where a second aesthetic fiber layer is positioned on the composite fiber layer. In an embodiment, a second aesthetic fiber layer 914 is provided in the composite fiber layer 912 using the chassis wall creation system and methods known in the art, as illustrated in FIG. 9f. The provision of the second aesthetic fiber layer 912 at block 812 provides a chassis wall 916, which may be the chassis wall 302 discussed above with reference to FIG. 3c, that includes the second aesthetic fiber layer 914 providing the outer surface 302a, the first aesthetic layer 900 providing the inner surface 302b. In addition, as can be seen in FIG. 9f, the first fiber layer sections 902 and 904, and the composite fiber layer 912, are stacked such that the second fiber layer section 906 and filled second fiber layer areas (e.g., 902a and 904a) on the first fiber layer sections 902 and 904 provide the wireless transmission window 320. In some embodiments, the antenna 318 may be embedded in the chassis wall 916 during the method 800 (e.g., between the composite fiber layer and filler in a second fiber layer area, between a composite fiber layer and an aesthetic fiber layer, etc.) As is known in the art, resins, molds, and/or other fiber wall provisioning equipment and materials may be used during the method 800 to provide the chassis wall 916. In an embodiment, silica loaded resins may be used to increase the stiffness of the chassis wall 916 relative to conventional resins. In addition, the aesthetic fiber layers 900 and 914 may be painted or otherwise treated to include a desired aesthetic characteristic. In some embodiments, only one aesthetic fiber layer may be provided (e.g., only the aesthetic fiber layer providing the outer surface 302a of the chassis wall 302) in the method 900.

Thus, methods for providing a chassis wall with a wireless transmission window have been described that allow for the use of high strength, low weight fiber materials, which would otherwise interfere with wireless transmissions, by providing those fiber materials as part of composite fiber layers that have second fiber layer sections with fiber materials that do not interfere with wireless transmissions and that are positioned adjacent antennas to allow for wireless transmissions without interference. The second fiber layer sections may be shaped to conform to any antenna shape. Furthermore, the width of the second fiber layer section(s) may be chosen such that the carbon fiber (or other wireless transmission interfering materials) are positioned far enough away from the antenna such that no wireless transmission interference exists. For example, the width of a second fiber layer section may be determined based on the size of the antenna. For example, based on the size of an antenna element, the second fiber layer section widths may be selected such that the first fiber layer sections are at least 2 millimeters away from any point on the antenna element in order to avoid any RF coupling or absorption issues.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A chassis wall, comprising:
   an aesthetic fiber layer that is free of a carbon fiber material and that provides a first surface of a chassis wall on a chassis;
   a housing layer that provides a second surface of the chassis wall that is opposite the chassis wall from the first surface and that is located immediately adjacent a housing defined by the chassis;
   a plurality of carbon fiber layers that are located between the aesthetic fiber layer and the housing layer, wherein each of the plurality of carbon fiber layers includes a carbon fiber material, and wherein the plurality of carbon fiber layers are stacked to provide a carbon fiber layer section of the chassis wall;
   at least one non-carbon fiber material that is located between the aesthetic fiber layer and the housing layer and that is free of a carbon fiber material, wherein the at least one non-carbon fiber material is positioned immediately adjacent the carbon fiber layer section of the chassis wall to provide a non-carbon fiber section of the chassis wall; and
   an antenna embedded in the non-carbon fiber section of the chassis wall between the aesthetic fiber layer and the housing layer.

2. The chassis wall of claim 1, wherein each of the plurality of carbon fiber layers includes a cut-out portion, and wherein the cut-out portions on each of the plurality of carbon fiber layers align when the plurality of carbon fiber layers are stacked, and wherein the at least one non-carbon fiber material is located in the cut-out portions on each of the plurality of carbon fiber layers.

3. The chassis wall of claim 1, wherein each of the plurality of carbon fiber layers includes an edge, and wherein the edges on each of the plurality of carbon fiber layers align when the plurality of carbon fiber layers are stacked, and wherein the at least one non-carbon fiber material extends from the edges on each of the plurality of carbon fiber layers.

4. The chassis wall of claim 1, wherein the at least one non-carbon fiber material is positioned immediately adjacent the carbon fiber layer section of the chassis wall to provide a first non-carbon fiber section of the chassis wall and a second non-carbon fiber section of the chassis wall that is spaced part from the first non-carbon fiber section by the carbon fiber layer section, and wherein the chassis wall further includes:
   a first antenna embedded in the first non-carbon fiber section of the chassis wall between the aesthetic fiber layer and the housing layer; and
   a second antenna embedded in the second non-carbon fiber section of the chassis wall between the aesthetic fiber layer and the housing layer.

5. The chassis wall of claim 1, wherein each of the plurality of carbon fiber layers is a composite carbon fiber layer.

6. The chassis wall of claim 1, wherein the at least one non-carbon fiber material includes at least one non-carbon fiber layer that is located between the aesthetic fiber layer and the housing layer, that extends from at least one of the plurality of carbon fiber layers, and that is free of a carbon fiber material.

7. The chassis wall of claim 6, wherein the non-carbon fiber material includes at least one of a polymer fiber material, a glass fiber material, and a ceramic fiber material.

8. An information handling system (IHS), comprising:
   a wireless communications device;
   an IHS chassis housing the wireless communications device, wherein the IHS chassis includes an IHS chassis wall having:
      an aesthetic fiber layer that is free of a carbon fiber material and that provides a first surface of the IHS chassis wall;
      a housing layer that provides a second surface of the IHS chassis wall that is opposite the IHS chassis wall from the first surface and that is located immediately adjacent a housing defined by the IHS chassis;
      a plurality of carbon fiber layers that are located between the aesthetic fiber layer and the housing layer, wherein each of the plurality of carbon fiber layers includes a carbon fiber material, and wherein the plurality of carbon fiber layers are stacked to provide a carbon fiber layer section of the IHS chassis wall; and
      at least one non-carbon fiber material that is located between the aesthetic fiber layer and the housing layer and that is free of a carbon fiber material, wherein the at least one non-carbon fiber material is positioned immediately adjacent the carbon fiber layer section of the chassis wall to provide a non-carbon fiber section of the IHS chassis wall; and
   an antenna that is coupled to the wireless communication device and that is embedded in the non-carbon fiber section of the IHS chassis wall between the aesthetic fiber layer and the housing layer.

9. The IHS of claim 8, wherein each of the plurality of carbon fiber layers includes a cut-out portion, and wherein the cut-out portions on each of the plurality of carbon fiber layers align when the plurality of carbon fiber layers are stacked, and wherein the at least one non-carbon fiber material is located in the cut-out portions on each of the plurality of carbon fiber layers.

10. The IHS of claim 8, wherein each of the plurality of carbon fiber layers includes an edge, and wherein the edges on each of the plurality of carbon fiber layers align when the plurality of carbon fiber layers are stacked, and wherein the at least one non-carbon fiber material extends from the edges on each of the plurality of carbon fiber layers.

11. The IHS of claim 8, wherein the at least one non-carbon fiber material is positioned immediately adjacent the carbon fiber layer section of the IHS chassis wall to provide a first non-carbon fiber section of the IHS chassis wall and a second non-carbon fiber section of the IHS chassis wall that is spaced part from the first non-carbon fiber section by the carbon fiber layer section, and wherein the IHS chassis wall further includes:
   a first antenna that is coupled to the wireless communication device and that is embedded in the first non-carbon fiber section of the IHS chassis wall between the aesthetic fiber layer and the housing layer; and
   a second antenna that is coupled to the wireless communication device and that is embedded in the second non-carbon fiber section of the IHS chassis wall between the aesthetic fiber layer and the housing layer.

12. The IHS of claim 8, wherein each of the plurality of carbon fiber layers is a composite carbon fiber layer.

13. The IHS of claim 8, wherein the at least one non-carbon fiber material includes at least one non-carbon fiber layer that is located between the aesthetic fiber layer and the housing layer, that extends from at least one of the plurality of carbon fiber layers, and that is free of a carbon fiber material.

14. The IHS of claim 13, wherein the non-carbon fiber material includes at least one of a polymer fiber material, a glass fiber material, and a ceramic fiber material.

15. A method for providing a wireless transmission window in a chassis wall, comprising:
providing an aesthetic fiber layer that is free of a carbon fiber material;
positioning a plurality of carbon fiber layers that each include a carbon fiber layer in a stacked orientation on the aesthetic layer to provide a carbon fiber layer section adjacent the aesthetic fiber layer;
providing at least one non-carbon fiber material that is free of a carbon fiber material on the aesthetic fiber layer such that the at least one non-carbon fiber material is positioned immediately adjacent the carbon fiber layer section to provide a non-carbon fiber section adjacent the aesthetic fiber layer;
embedding an antenna in the non-carbon fiber section adjacent the aesthetic fiber layer; and
positioning a housing layer on the carbon fiber layer section and the non-carbon fiber layer section such that the plurality of carbon fiber layers and the at least one non-carbon fiber material are located between the aesthetic fiber layer an the housing layer.

16. The method of claim 15, further comprising:
providing a cut-out portion in each of the plurality of carbon fiber layers, wherein the cut-out portions on each of the plurality of carbon fiber layers align when the plurality of carbon fiber layers are stacked; and
providing the at least one non-carbon fiber material in the cut-out portions on each of the plurality of carbon fiber layers.

17. The method of claim 15, further comprising:
aligning edges on each of the plurality of carbon fiber layers align when the plurality of carbon fiber layers are stacked; and
providing the at least one non-carbon fiber material extending from the edges on each of the plurality of carbon fiber layers.

18. The method of claim 15, wherein the at least one non-carbon fiber material is positioned immediately adjacent the carbon fiber layer section to provide a first non-carbon fiber section and a second non-carbon fiber section that is spaced part from the first non-carbon fiber section by the carbon fiber layer section, and wherein the method further include:
embedding a first antenna in the first non-carbon fiber section between the aesthetic fiber layer and the housing layer; and
embedding a second antenna in the second non-carbon fiber section between the aesthetic fiber layer and the housing layer.

19. The method of claim 15, wherein each of the plurality of carbon fiber layers is a composite carbon fiber layer.

20. The method of claim 15, wherein the at least one non-carbon fiber material includes at least one non-carbon fiber layer that is located between the aesthetic fiber layer and the housing layer, that extends from at least one of the plurality of carbon fiber layers, and that is free of a carbon fiber material.

* * * * *